United States Patent
Sakaguchi

(10) Patent No.: US 11,461,684 B2
(45) Date of Patent: Oct. 4, 2022

(54) OPERATION PROCESSING CIRCUIT AND RECOGNITION SYSTEM

(71) Applicant: Sony Semiconductor Solutions Corporation, Kanagawa (JP)

(72) Inventor: Hiroaki Sakaguchi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 880 days.

(21) Appl. No.: 16/331,727

(22) PCT Filed: Jul. 4, 2017

(86) PCT No.: PCT/JP2017/024422
§ 371 (c)(1),
(2) Date: Mar. 8, 2019

(87) PCT Pub. No.: WO2018/074012
PCT Pub. Date: Apr. 26, 2018

(65) Prior Publication Data
US 2019/0205780 A1    Jul. 4, 2019

(30) Foreign Application Priority Data

Oct. 19, 2016  (JP) .............................. JP2016-205451

(51) Int. Cl.
*G06N 7/00* (2006.01)
*G06K 9/62* (2022.01)
(Continued)

(52) U.S. Cl.
CPC ............ *G06N 7/00* (2013.01); *G06F 17/153* (2013.01); *G06K 9/6232* (2013.01);
(Continued)

(58) Field of Classification Search
None
See application file for complete search history.

(56) References Cited

U.S. PATENT DOCUMENTS

2018/0165574 A1*  6/2018  Young .................. G06N 3/04
2018/0315155 A1* 11/2018  Park ..................... G06N 3/063

FOREIGN PATENT DOCUMENTS

JP    2001-067338 A    3/2001
JP    2009-080693 A    4/2009
(Continued)

OTHER PUBLICATIONS

Wang et al. ("Efficient convolution architectures for convolutional neural network," 2016 8th International Conference on Wireless Communications & Signal Processing (WCSP), 2016, pp. 1-5) (Year: 2016).*

*Primary Examiner* — Roy Y Yi
(74) *Attorney, Agent, or Firm* — Michael Best & Friedrich LLP

(57) ABSTRACT

Parallel processing suitable for convolution operation in a convolutional neural network is executed.

Each of a plurality of selectors sequentially selects data, which is held in a two-dimensional shift register, in predetermined two-dimensional regions at least partially different from each other. Each of a plurality of two-dimensional convolution operation circuits multiplies the data selected by the corresponding selector by coefficient data stored in a coefficient memory and accumulates results of the multiplication to calculate, in parallel, two-dimensional convolution operation results in the two-dimensional regions. Each of a plurality of adder circuits adds operation results of the two-dimensional convolution operation circuits in a channel direction to output a three-dimensional convolution operation result.

13 Claims, 21 Drawing Sheets

(51) Int. Cl.
    *G06N 3/04*           (2006.01)
    *G06F 17/15*         (2006.01)
    *G06V 10/94*        (2022.01)
    *G06N 3/063*       (2006.01)
    *G06V 10/44*        (2022.01)

(52) U.S. Cl.
    CPC ............ *G06K 9/6273* (2013.01); *G06N 3/04*
            (2013.01); *G06N 3/063* (2013.01); *G06V*
            *10/454* (2022.01); *G06V 10/955* (2022.01)

(56) References Cited

FOREIGN PATENT DOCUMENTS

| | | |
|---|---|---|
| JP | 2010-134697 A | 6/2010 |
| JP | 2015-210709 A | 11/2015 |

\* cited by examiner

F I G . 5
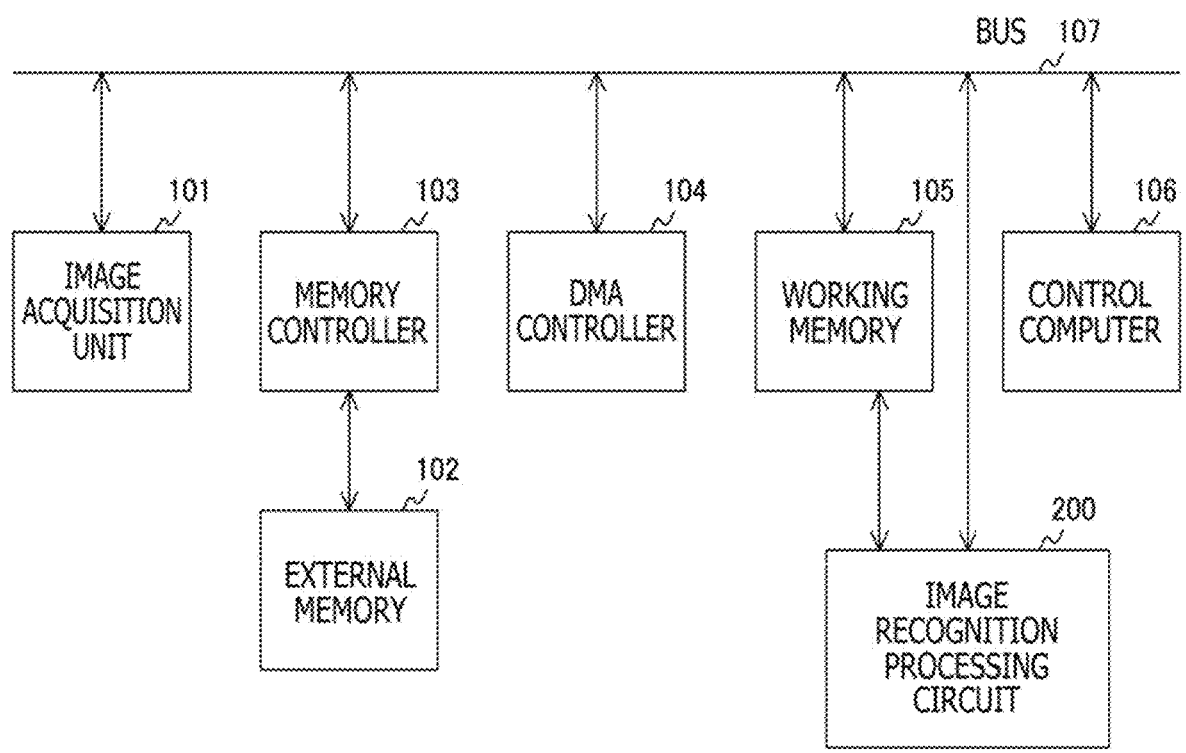

FIG.11

| CYCLE | SELECTION SIGNAL | SELECTION SIGNAL (H, V) | SELECTOR OUTPUT | COEFFICIENT ADDRESS | COEFFICIENT DATA | CONVOLUTION OPERATION OUTPUT EFFECTIVE BIT | CONVOLUTION OPERATION OUTPUT |
|---|---|---|---|---|---|---|---|
| 1 | 0 | (0, 0) | D0 | 0 | Coef[0] | L | $D0 \times Coef[0]$ |
| 2 | 1 | (1, 0) | D1 | 1 | Coef[1] | L | $\sum_{i=0,1} Di \times Coef[i]$ |
| 3 | 2 | (2, 0) | D2 | 2 | Coef[2] | L | $\sum_{i=0,1,2} Di \times Coef[i]$ |
| 4 | 3 | (0, 1) | D3 | 3 | Coef[3] | L | $\sum_{i=0,\cdots,3} Di \times Coef[i]$ |
| 5 | 4 | (1, 1) | D4 | 4 | Coef[4] | L | $\sum_{i=0,\cdots,4} Di \times Coef[i]$ |
| 6 | 5 | (2, 1) | D5 | 5 | Coef[5] | L | $\sum_{i=0,\cdots,5} Di \times Coef[i]$ |
| 7 | 6 | (0, 2) | D6 | 6 | Coef[6] | L | $\sum_{i=0,\cdots,6} Di \times Coef[i]$ |
| 8 | 7 | (1, 2) | D7 | 7 | Coef[7] | L | $\sum_{i=0,\cdots,7} Di \times Coef[i]$ |
| 9 | 8 | (2, 2) | D8 | 8 | Coef[8] | H | $\sum_{i=0,\cdots,8} Di \times Coef[i]$ |

FIG.14

| CYCLE | SELECTION SIGNAL | SELECTION SIGNAL (H, V) | SELECTOR OUTPUT | COEFFICIENT ADDRESS | COEFFICIENT DATA | CONVOLUTION OPERATION OUTPUT EFFECTIVE BIT | CONVOLUTION OPERATION OUTPUT |
|---|---|---|---|---|---|---|---|
| 1 | 0 | (0, 0) | D0 | 0 | Coef[0] | L | $D0 \times Coef[0]$ |
| 2 | 1 | (1, 0) | D1 | 1 | Coef[1] | L | $\sum_{i=0,1} Di \times Coef[i]$ |
| 3 | 2 | (2, 0) | D2 | 2 | Coef[2] | L | $\sum_{i=0,1,2} Di \times Coef[i]$ |
| 4 | 3 | (0, 1) | D3 | 3 | Coef[3] | L | $\sum_{i=0,\ldots,3} Di \times Coef[i]$ |
| 5 | 4 | (1, 1) | D4 | 4 | Coef[4] | L | $\sum_{i=0,\ldots,4} Di \times Coef[i]$ |
| 6 | 5 | (2, 1) | D5 | 5 | Coef[5] | L | $\sum_{i=0,\ldots,5} Di \times Coef[i]$ |
| 7 | 6 | (0, 2) | D6 | 6 | Coef[6] | L | $\sum_{i=0,\ldots,6} Di \times Coef[i]$ |
| 8 | 7 | (1, 2) | D7 | 7 | Coef[7] | L | $\sum_{i=0,\ldots,7} Di \times Coef[i]$ |
| 9 | 8 | (2, 2) | D8 | 8 | Coef[8] | H | $\sum_{i=0,\ldots,8} Di \times Coef[i]$ |
| 10 | 0 | (0, 0) | D0 | 9 | Coef[9] | L | $D0 \times Coef[9]$ |
| 11 | 1 | (1, 0) | D1 | 10 | Coef[10] | L | $\sum_{i=0,1} Di \times Coef[i+9]$ |
| 12 | 2 | (2, 0) | D2 | 11 | Coef[11] | L | $\sum_{i=0,1,2} Di \times Coef[i+9]$ |
| 13 | 3 | (0, 1) | D3 | 12 | Coef[12] | L | $\sum_{i=0,\ldots,3} Di \times Coef[i+9]$ |
| 14 | 4 | (1, 1) | D4 | 13 | Coef[13] | L | $\sum_{i=0,\ldots,4} Di \times Coef[i+9]$ |
| 15 | 5 | (2, 1) | D5 | 14 | Coef[14] | L | $\sum_{i=0,\ldots,5} Di \times Coef[i+9]$ |
| 16 | 6 | (0, 2) | D6 | 15 | Coef[15] | L | $\sum_{i=0,\ldots,6} Di \times Coef[i+9]$ |
| 17 | 7 | (1, 3) | D7 | 16 | Coef[16] | L | $\sum_{i=0,\ldots,7} Di \times Coef[i+9]$ |
| 18 | 8 | (2, 3) | D8 | 17 | Coef[17] | H | $\sum_{i=0,\ldots,8} Di \times Coef[i+9]$ |

OPERATION PROCESSING CIRCUIT AND RECOGNITION SYSTEM

TECHNICAL FIELD

The present technique relates to an operation processing circuit. Particularly, the present technique relates to an operation processing circuit that performs convolution operation and a recognition system that uses the operation processing circuit to recognize data.

BACKGROUND ART

A convolutional neural network (CNN) is drawing attention as one of neural networks including a plurality of hierarchically connected processing layers. The convolutional neural network includes a convolutional layer for using a plurality of kernels to perform convolution, a pooling layer with a function of subsampling for abstraction, and a fully connected layer arranged in a layer close to an output layer to function as a classifier according to output. An apparatus causing a plurality of operation units to operate in parallel is proposed to execute convolution operation in the convolutional neural network at a high speed. For example, an apparatus is proposed, in which a plurality of product-sum operation units execute, in parallel, convolution operation of positions shifted in a column direction (for example, see PTL 1). In addition, an apparatus is proposed, in which two systolic arrays are connected to execute, in parallel, a convolution operation process of data at positions different from each other (for example, see PTL 2).

CITATION LIST

Patent Literature

[PTL 1]
  Japanese Patent Laid-Open No. 2010-134697
[PTL 2]
  Japanese Patent Laid-Open No. 2015-210709

SUMMARY

Technical Problem

In the conventional techniques, a plurality of convolution operations are executed in parallel to increase the speed of the operation process in the convolutional neural network. However, it may be difficult to secure sufficient parallelism when the target of parallel operation is limited only to the column direction or limited only to the positions different from each other.

The present technique has been made in view of the circumstances, and an object of the present technique is to execute parallel processing suitable for convolution operation in a convolutional neural network.

Solution to Problem

The present technique has been made to solve the problems, and a first aspect of the present technique provides an operation processing circuit including: a two-dimensional shift register including a plurality of shift registers arranged in a first direction that are lined up and sequentially connected in a second direction perpendicularly intersecting the first direction; a plurality of selectors that sequentially select data in predetermined two-dimensional regions at least partially different from each other from data held in the two-dimensional shift register; a coefficient memory that stores coefficient data corresponding to the data held in the two-dimensional shift register; a plurality of two-dimensional convolution operation circuits provided corresponding to the plurality of selectors and configured to multiply the data selected by the selectors by the coefficient data stored in the coefficient memory and accumulate results of the multiplication to calculate, in parallel, two-dimensional convolution operation results in the two-dimensional regions; and a plurality of adder circuits provided corresponding to the plurality of two-dimensional convolution operation circuits and configured to add operation results of the plurality of two-dimensional convolution operation circuits in a channel direction to output a three-dimensional convolution operation result. This has an effect that the data is supplied from the two-dimensional shift register to the plurality of two-dimensional convolution operation circuits at the same time through the plurality of selectors to calculate, in parallel, the two-dimensional convolution operation results.

Furthermore, in the first aspect, the coefficient memory may store a plurality of types of the coefficient data, and each of the plurality of two-dimensional convolution operation circuits may continuously perform the two-dimensional convolution operation of the data selected by the plurality of selectors and the plurality of types of the coefficient data without replacing the data held in the two-dimensional shift register. This has an effect that the two-dimensional shift register continuously performs the convolution operation of a new coefficient without shifting in new data, and the number of shift-in operations is reduced.

Furthermore, in the first aspect, the coefficient memory may store a plurality of types of the coefficient data, and each of the plurality of two-dimensional convolution operation circuits may perform, in parallel, the two-dimensional convolution operation for the plurality of types of coefficient data. This has an effect that the convolution operation of different types of coefficients is performed at the same time to improve the degree of parallelism.

Furthermore, in the first aspect, each of the plurality of two-dimensional convolution operation circuits may further perform the two-dimensional convolution operation in parallel for the data in the two-dimensional regions different from each other of the data held in the two-dimensional shift register. This has an effect that the parallel processing is further applied to the plurality of two-dimensional regions different from each other to improve the degree of parallelism.

Furthermore, in the first aspect, the operation processing circuit may further include a two-dimensional convolution operation result holding unit that holds operation results of the plurality of two-dimensional convolution operation circuits, in which the plurality of adder circuits add, in the channel direction, the operation results of the plurality of two-dimensional convolution operation circuits and the operation results held in the two-dimensional convolution operation result holding unit. This has an effect that the two-dimensional convolution operation results are added in the channel direction to generate the three-dimensional convolution operation result.

Furthermore, in the first aspect, the plurality of adder circuits may add the operation results of the plurality of two-dimensional convolution operation circuits in parallel in the channel direction to output a three-dimensional convolution operation result. This has an effect that the two-dimensional convolution operations regarding the plurality of channels are further processed in parallel in the channel direction to improve the degree of parallelism.

Furthermore, in the first aspect, the operation processing circuit may further include an activation process circuit that applies a predetermined activation process to the three-dimensional convolution operation result output from the plurality of adder circuits. This has an effect that the activation process necessary for the operation of the convolutional layer is executed.

Furthermore, in the first aspect, the operation processing circuit may further include a pooling process circuit that applies a pooling process to the three-dimensional convolution operation result output from the plurality of adder circuits. This has an effect that the pooling process necessary for the operation of the pooling layer is executed. In this case, the pooling process may include a process of generating a pooling value of at least one of a sum total, an average, or a maximum value of a plurality of values in the three-dimensional convolution operation result.

Furthermore, in the first aspect, the two-dimensional shift register may hold equal to or more than $(m \times k_w + p_w - 1) + 1) \times ((k_h + p_h - 1) + 1)$ pieces of data, the plurality of two-dimensional convolution operation circuits may include $(m \times p_w \times p_h)$ multipliers that perform the multiplication and $(m \times p_w \times p_h)$ accumulators that perform the accumulation to perform, in parallel, the two-dimensional convolution operation of a $(k_w \times k_h)$ size for $(p_w \times p_h)$ two-dimensional regions, and the pooling process circuit may use $(m \times p_w \times p_h)$ three-dimensional convolution operation results as input data to generate m pooling values, m being an integer equal to or greater than 1, and $k_w$, $k_h$, $P_w$, and $p_h$ are integers equal to or greater than 2. This has an effect that the $(m \times p_w \times p_h)$ multipliers process, in parallel, the two-dimensional convolution operation of the $(k_w \times k_n)$ size for the $(p_w \times p_h)$ two-dimensional regions. In this case, the plurality of shift registers of the two-dimensional shift register may include registers wired in the first direction so that there are $(p_w - 1)$ registers between the registers, and the plurality of shift registers may perform shift operation in the first direction on a basis of $p_w$ registers. This has an effect that the two-dimensional shift register performs the shifting in parallel on the basis of $p_w$ registers.

Furthermore, in the first aspect, the data held in the two-dimensional shift register may be used as an input to execute a feature amount extraction process of a convolutional layer and a pooling layer in a convolutional neural network.

Furthermore, a second aspect of the present technique provides a recognition system including: a data acquisition unit that acquires data to be processed; and an operation processing circuit that uses the data as an input to execute a feature amount extraction process of a convolutional layer and a pooling layer in a convolutional neural network, the operation processing circuit including: a two-dimensional shift register including a plurality of shift registers arranged in a first direction that are lined up and sequentially connected in a second direction perpendicularly intersecting the first direction; a plurality of selectors that sequentially select data in predetermined two-dimensional regions at least partially different from each other from data held in the two-dimensional shift register; a coefficient memory that stores coefficient data corresponding to the data held in the two-dimensional shift register; a plurality of two-dimensional convolution operation circuits provided corresponding to the plurality of selectors and configured to multiply the data selected by the selectors by the coefficient data stored in the coefficient memory and accumulate results of the multiplication to calculate, in parallel, two-dimensional convolution operation results in the two-dimensional regions; a plurality of adder circuits provided corresponding to the plurality of two-dimensional convolution operation circuits and configured to add operation results of the plurality of two-dimensional convolution operation circuits in a channel direction to output a three-dimensional convolution operation result; and a pooling process circuit that applies a pooling process to the three-dimensional convolution operation result output from the plurality of adder circuits, in which the recognition system repeats operation of causing the two-dimensional shift register to hold the data to execute the process in the operation processing circuit to output the three-dimensional convolution operation result as a feature amount of the data and then causing the two-dimensional shift register to hold the output feature amount again to execute the process in the operation processing circuit to output the three-dimensional convolution operation result as a new feature amount. This has an effect that the data is supplied from the two-dimensional shift register to the plurality of two-dimensional convolution operation circuits at the same time through the plurality of selectors to calculate the two-dimensional convolution operation results in parallel to output the three-dimensional convolution operation result as a new feature amount.

Advantageous Effect of the Invention

The present technique can attain an excellent advantageous effect of allowing to execute parallel processing suitable for the convolution operation in the convolutional neural network. Note that the advantageous effect described here may not be limited, and the advantageous effect may be any of the advantageous effects described in the present disclosure.

BRIEF DESCRIPTION OF DRAWINGS

FIG. 5 is a diagram illustrating a configuration example of an image recognition system according to embodiments of the present technique.

FIG. 11 is a diagram illustrating a control example of the selector 224 according to the embodiments of the present technique.

FIG. 14 is a diagram illustrating an example of controlling the selector 224 according to a second embodiment of the present technique.

DESCRIPTION OF EMBODIMENTS

Hereinafter, modes for carrying out the present technique (hereinafter, referred to as embodiments) will be described. The embodiments will be described in the following order.
1. Convolutional Neural Network
2. First Embodiment (Example of Parallel Processing of Offset Regions)
3. Second Embodiment (Example of Continuously Performing Convolution Operation of a Plurality of Different Coefficients)
4. Third Embodiment (Example of Performing Convolution Operation of a Plurality of Different Coefficients at the Same Time)
5. Fourth Embodiment (Example of Further Processing a Plurality of Regions in Parallel)
6. Fifth Embodiment (Example of Further Executing Parallel Processing in Channel Direction)

1. Convolutional Neural Network

Figure 1:
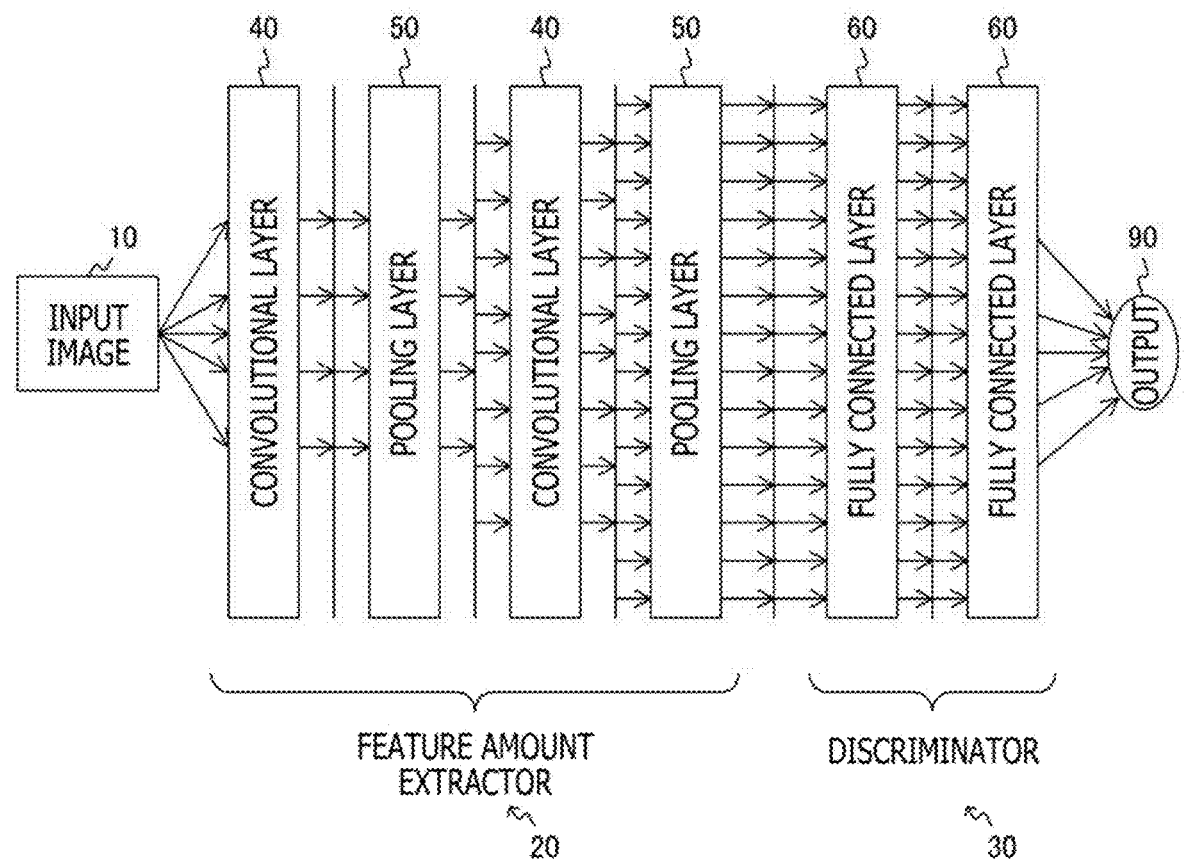
FIG. 1 is a diagram illustrating an overview of a convolutional neural network.

FIG. 1 is a diagram illustrating an overview of a convolutional neural network. The convolutional neural network is a type of neural network provided with neurons corresponding to visual cortices, and convolution operation is used to efficiently extract a feature amount. In the convolutional neural network illustrated here, an input image 10 is repeatedly processed through a plurality of layers to obtain an output 90.

The convolutional neural network is roughly divided into a feature amount extractor 20 and a discriminator 30. The feature amount extractor 20 provides layers for extracting the feature amount, and a convolutional layer 40 for using a plurality of kernels to perform convolution and a pooling layer 50 with a function of subsampling for abstraction are alternately repeated. The discriminator 30 provides layers for classification including one or more continuous fully connected layers 60 that function as classifiers according to the output.

The convolutional neural network is designed with reference to the visual cortices of the brain of a mammal. For example, it is found in an experiment that a process close to an orientation-selective Gabor filter (product of Gaussian and sine wave) is executed in the primary visual cortex (V1 cortex) of a cat or a human as a mammal, and higher layers, such as V2 cortex and V4 cortex, react to high-dimensional figures.

It is also known that the filter acquired by learning in the convolutional layer 40 in the first stage of the convolutional neural network is often a simple filter, such as an edge detection filter, similar to the Gabor filter, and more complicated filters are acquired by learning in later stages. The filters form a layered structure, and deeper layers can attain a feature amount extraction function for reacting to higher-dimensional figures.

Recently, the revival of the neural network for deep learning is discussed. This is because not only the discriminator, but also the feature amount extraction can be learned at the same time by deepening the layers of the network. This is also because it has become apparent that learning of a network with higher performance than the existing recognizer, such as boosting, is possible just by preparing a large amount of data sets.

Figure 2:
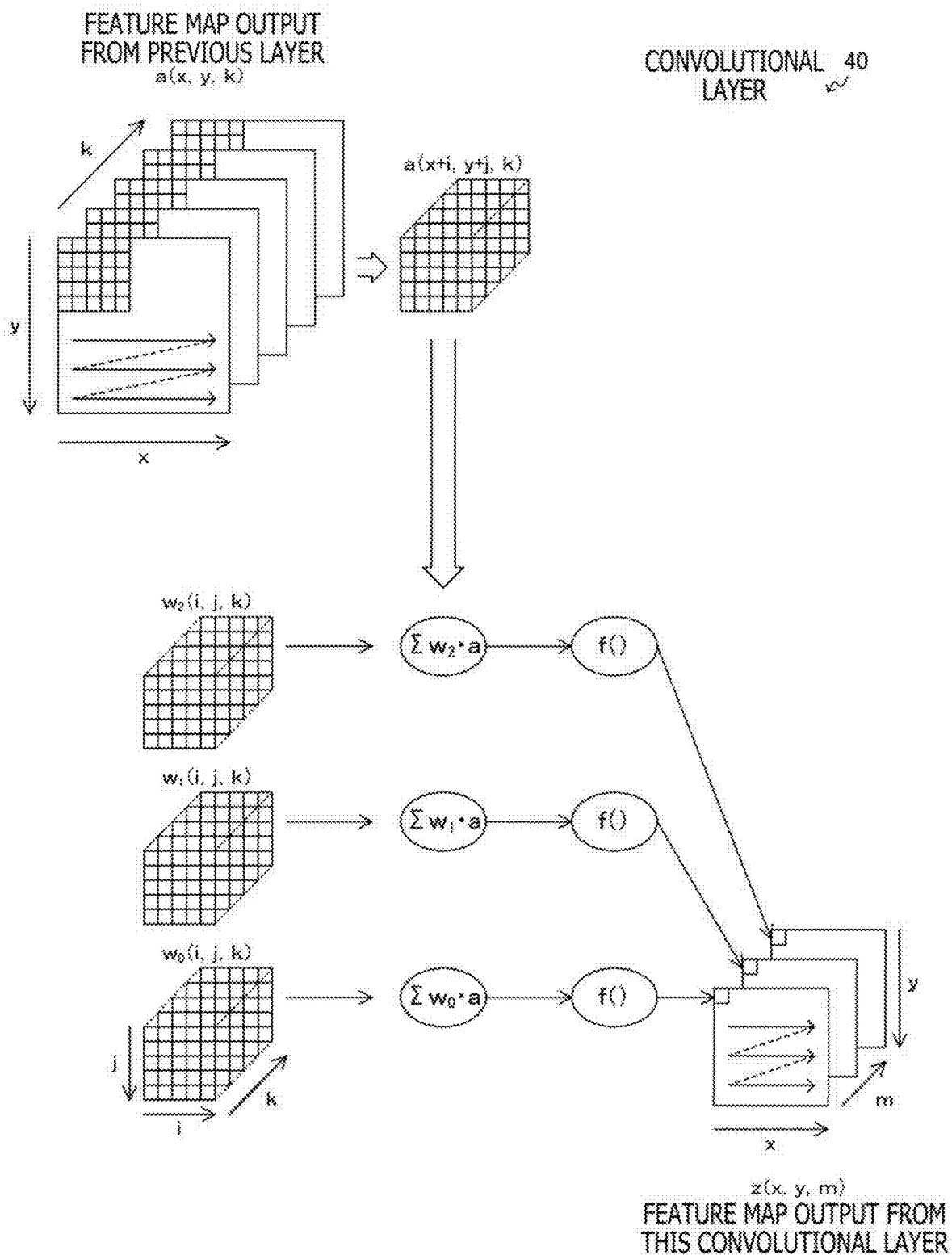
FIG. 2 is a diagram illustrating details of operation of a convolutional layer 40 in the convolutional neural network.

FIG. 2 is a diagram illustrating details of operation of the convolutional layer 40 in the convolutional neural network.

The data input to the convolutional layer 40 is a three-dimensional feature map a (x, y, k) output from the previous layer. Here, x represents a coordinate position in a horizontal direction, y represents a coordinate position in a vertical direction, k represents a channel number, and x, y, and k are integers. The feature map a (x, y, k) has a size of K channels in a channel direction. Note that K is an integer. A feature map with equal to or more than 512 channels may be handled in the convolutional neural network.

A weight coefficient w (i, j, k) for an output-side map m is used in the convolutional layer 40. Here, i represents a coordinate position in the horizontal direction, j represents a coordinate position in the vertical direction, m represents a channel number in the output-side map, and i, j, and m are integers.

The data output from the convolutional layer 40 is a three-dimensional feature map z (x, y, m). Here, m represents a channel number and is an integer. The feature map z (x, y, m) has a size of M channels in the channel direction. Note that M is an integer.

A convolution operation is performed in the convolutional layer 40, in which each of M types of weight coefficients $w_m$ (i, j, k) is convoluted into the feature map a (x, y, k) in the channel direction. The convolution operation is equivalent to a three-dimensional filtering process using the weight coefficients $w_m$ (i, j, k). In addition, a bias $b_m$ is added as necessary. In addition, an activation function f( ) is applied as necessary. These are expressed by an equation as in the following equation.

$$u(x,y,m) = b_m + \Sigma_{k=0 \ldots K-1} \Sigma_{j=0 \ldots J-1} \Sigma_{i=0 \ldots I-1}$$

$$(w_m(i,j,k) \times a(x+i, y+j, k))$$

$$z(x,y,m) = f(u(x,y,m))$$

Note that I represents a size in the horizontal direction, J represents a size in the vertical direction, K represents a size in the channel direction, and I, J, and K are integers. The example of FIG. 2 illustrates a case in which the size is 5×5×5 (I=j=K=5).

Note that although a ramp function (ReLU), a sigmoid function, a hyperbolic tangent function (tan h), or the like is used as the activation function f( ), the activation function f( ) may not be applied.

Figure 3:
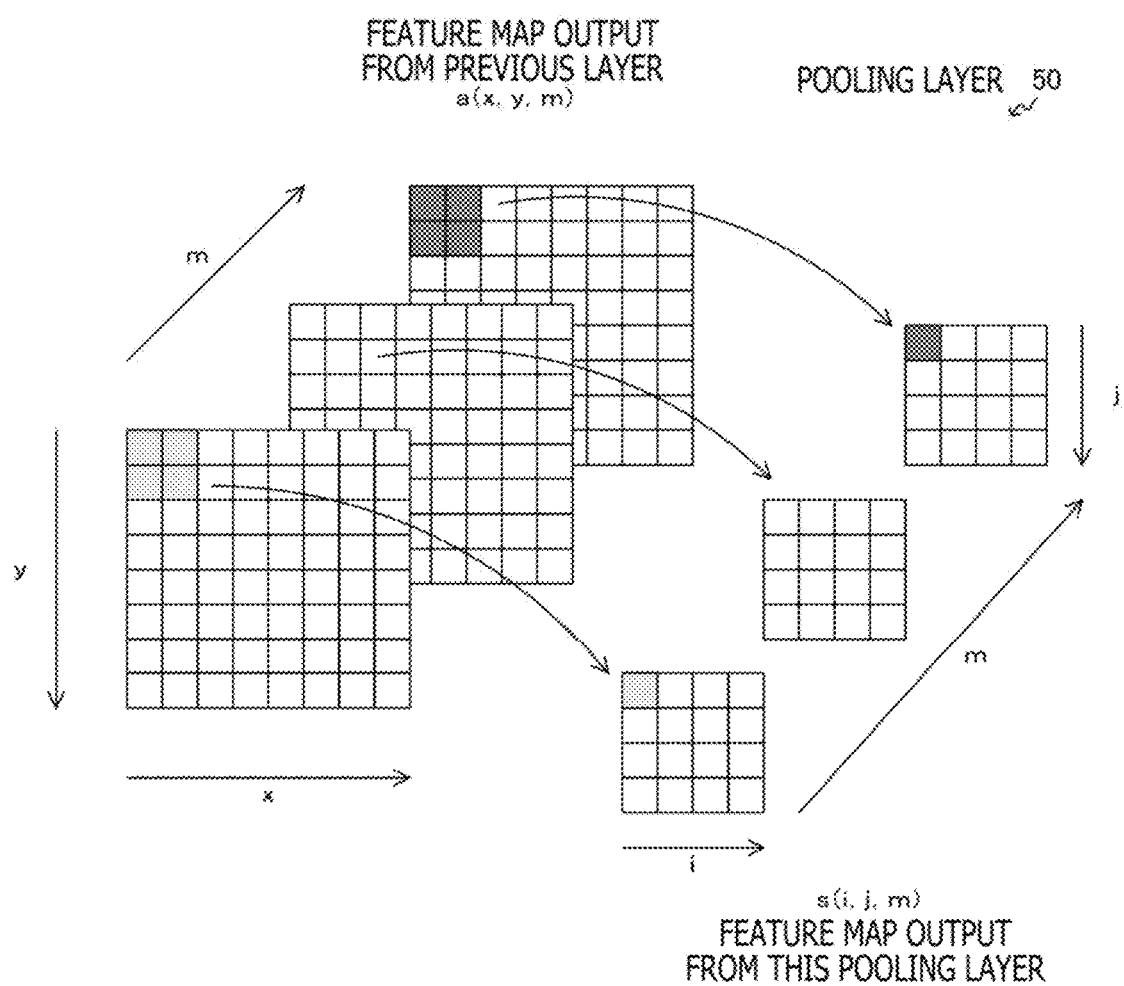
FIG. 3 is a diagram illustrating details of operation of a pooling layer 50 in the convolutional neural network.

FIG. 3 is a diagram illustrating details of operation of the pooling layer 50 in the convolutional neural network.

The data input to the pooling layer 50 is a three-dimensional feature map a (x, y, m) output from the previous layer. Here, x represents a coordinate position in the horizontal direction, y represents a coordinate position in the vertical direction, m represents a channel number, and x, y, and m are integers. The feature map a (x, y, m) has a size of M channels in the channel direction. Note that M is an integer.

The data output from the pooling layer 50 is a three-dimensional feature map s (i, j, m). Here, i represents a coordinate position in the horizontal direction, j represents a coordinate position in the vertical direction, m represents a channel number in the output-side map, and i, j, and m are integers. The feature map s (i, j, m) has a size of M channels in the channel direction similarly to the input.

A pooling function fp( ) is applied to the feature map a (x, y, m) in the pooling layer 50. The process in the pooling layer 50 is expressed by an equation as in the following equation.

$$s(i,j,m) = fp(a(2 \times i, 2 \times j, m),$$

$$a(2 \times i+1, 2 \times j, m),$$

$$a(2 \times i, 2 \times j+1, m),$$

$$a(2 \times i+1, 2 \times j+1, m))$$

Note that a total value, an average value, a maximum value, or the like is used as the pooling function fp( ).

Figure 4:
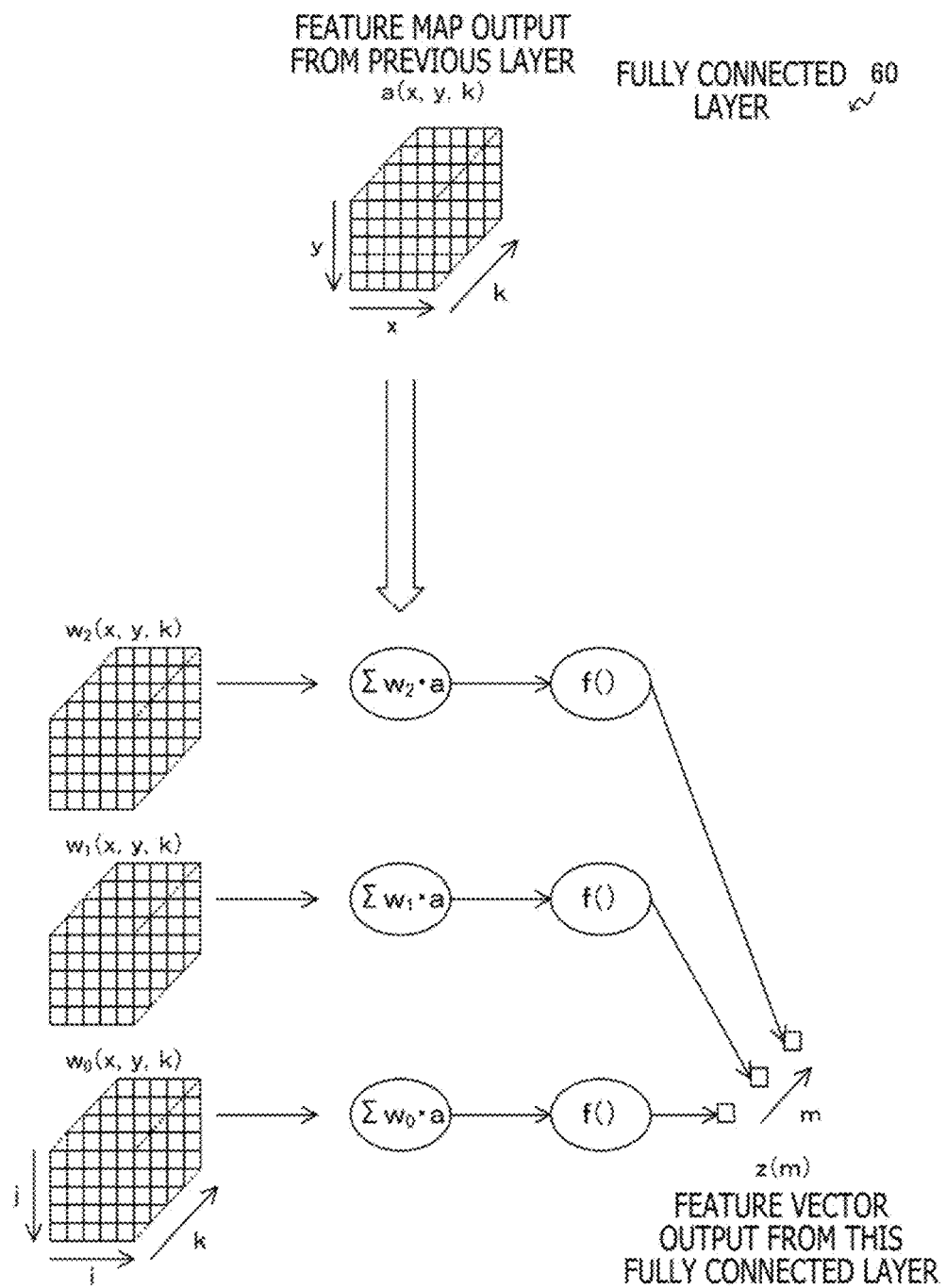
FIG. 4 is a diagram illustrating details of operation of a fully connected layer 60 in the convolutional neural network.

FIG. 4 is a diagram illustrating details of operation of the fully connected layer 60 in the convolutional neural network.

The data input to the fully connected layer 60 is a three-dimensional feature map a (x, y, k) output from the previous layer. Here, x represents a coordinate position in the horizontal direction, y represents a coordinate position in the vertical direction, k represents a channel number, and x, y, and k are integers. The feature map a (x, y, k) has a size of K channels in the channel direction. Note that K is an integer.

A weight coefficient $w_m$ (x, y, k) for an output-side map m is used in the fully connected layer 60. Here, i represents a coordinate position in the horizontal direction, j represents a coordinate position in the vertical direction, m represents a channel number in the output-side map, and i, j, and m are integers.

The data output from the fully connected layer 60 is a three-dimensional feature map z (x, y, m). Here, m represents a channel number and is an integer. The feature map z (x, y, m) has a size of M channels in the channel direction. Note that M is an integer.

A convolution operation is performed in the fully connected layer 60, in which each of M types of weight coefficients $w_m$ (x, y, k) is convoluted into the feature map a (x, y, k) in the channel direction. In addition, a bias $b_m$ is added as necessary. In addition, an activation function f( ) is applied as necessary. These are expressed by an equation as in the following equation.

$$u(m) = b_m + \Sigma_{k=0 \ldots K-1} \Sigma_{y=0 \ldots Y-1} \Sigma_{x=0 \ldots X-1}$$

$$(w_m(x,y,k) \times a(x,y,k))$$

$$z(m) = f(u(m))$$

Note that X represents a size in the horizontal direction, Y represents a size in the vertical direction, K represents a size in the channel direction, and X, Y, and K are integers. The example of FIG. 4 illustrates a case in which the size is 5×5×5 (X=Y=K=5).

Note that although a ramp function (ReLU), a sigmoid function, a hyperbolic tangent function (tan h), or the like is used as the activation function f( ), the activation function f( ) may not be applied.

2. First Embodiment

[Image Recognition System]

FIG. 5 is a diagram illustrating a configuration example of an image recognition system according to embodiments of the present technique. The image recognition system includes an image acquisition unit 101, an external memory 102, a memory controller 103, a DMA controller 104, a working memory 105, a control computer 106, and an image recognition processing circuit 200. Note that although the image recognition system is described as an example in the embodiment, the present technique can be applied to multidimensional data in general (tensor data) and can be used for a recognition system for data other than images.

The image acquisition unit 101 is configured to acquire image data as a target of image recognition. The image acquisition unit 101 may be an image sensor that photoelectrically converts light from the subject to acquire image data or may be an input unit that acquires image data from another apparatus or recording medium.

The control computer 106 is a computer that controls the entire image recognition system. The external memory 102 is an external memory of the image recognition system and is accessed by the control computer 106 and the like. The memory controller 103 is a controller for accessing the external memory 102. The DMA controller 104 is a controller for using DMA (Direct Memory Access) to transfer data between the external memory 102 and the working memory 105 through a bus 107.

The image recognition processing circuit 200 is a circuit that uses an image acquired by the image acquisition unit 101 as an input image to execute an image recognition process. The image recognition processing circuit 200 executes a feature amount extraction process of the convolutional layer 40 and the pooling layer 50 in the convolutional neural network to execute a discrimination process of the fully connected layer 60.

The working memory 105 is a memory that holds data necessary for the process in the image recognition processing circuit 200. Specifically, the working memory 105 holds the image data as the target of the image recognition, the feature maps input and output in each layer, the bias $b_m$, and the like. Note that the working memory 105 is an example of a two-dimensional convolution operation result holding unit described in the claims.

[Image Recognition Processing Circuit]

Figure 6:
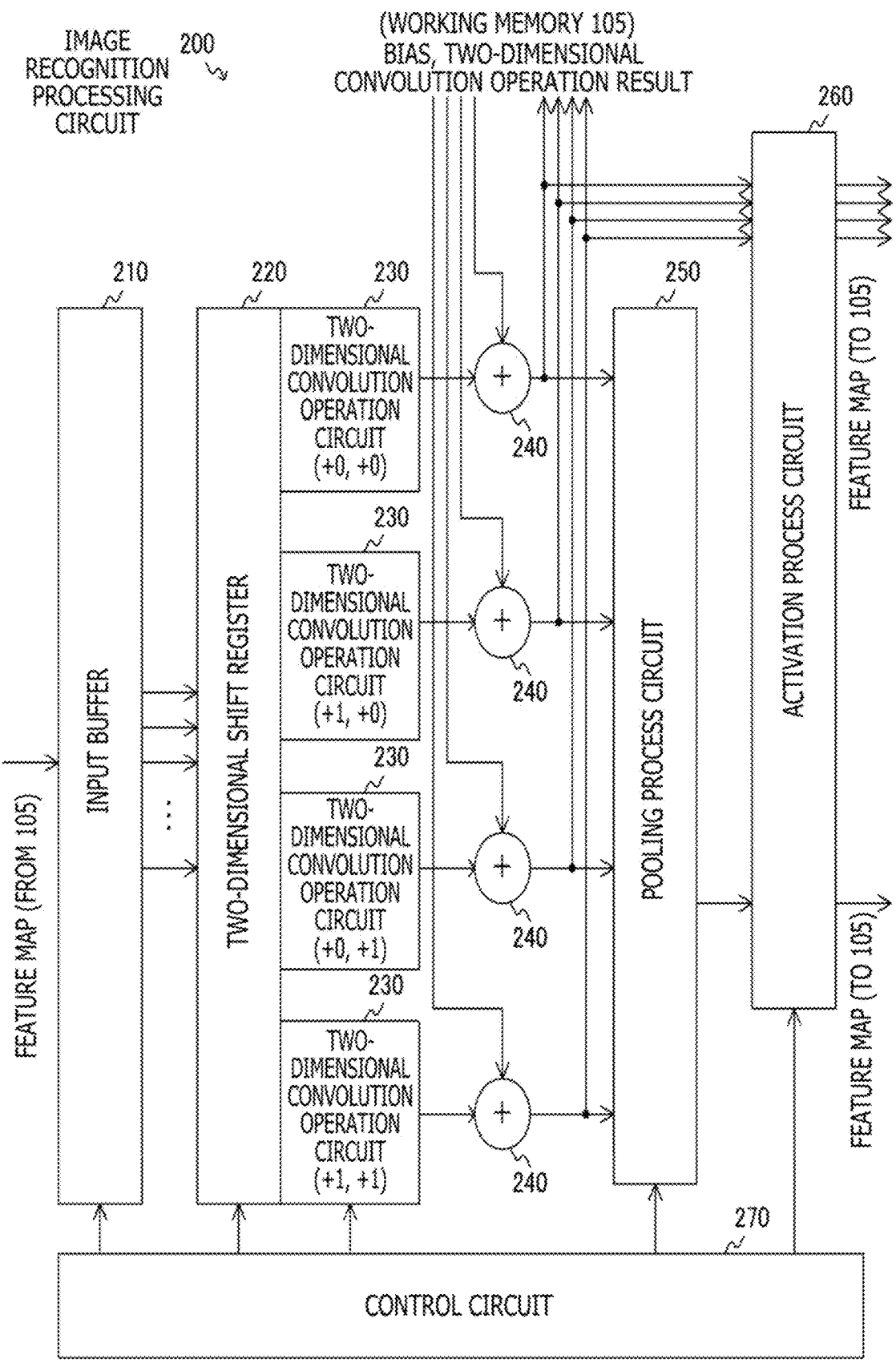
FIG. 6 is a diagram illustrating a configuration example of an image recognition processing circuit 200 according to a first embodiment of the present technique.

FIG. 6 is a diagram illustrating a configuration example of the image recognition processing circuit 200 according to a first embodiment of the present technique. The image recognition processing circuit 200 includes an input buffer 210, a two-dimensional shift register 220, a plurality of two-dimensional convolution operation circuits 230, a plurality of adder circuits 240, a pooling process circuit 250, an activation process circuit 260, and a control circuit 270.

The input buffer 210 is a buffer that reads the feature maps from the working memory 105 and holds the feature maps as input data of the image recognition processing circuit 200. The data held in the input buffer 210 is supplied to the two-dimensional shift register 220.

The two-dimensional shift register 220 is a shift register that holds the data supplied from the input buffer 210 in two-dimensional regions. The two-dimensional shift register 220 includes a plurality of shift registers arranged in a row direction that are lined up and sequentially connected in a column direction. Note that a plurality of shift registers arranged in the column direction may be lined up and sequentially connected in the row direction. The two-dimensional shift register 220 includes a plurality of selectors as described later and supplies data to the two-dimensional convolution operation circuits 230 through the plurality of selectors.

The plurality of two-dimensional convolution operation circuits 230 are configured to multiply the data supplied through the selectors by coefficient data and accumulate the results of the multiplication to calculate, in parallel, two-dimensional convolution operation results in the two-dimensional regions of the two-dimensional shift register 220. The plurality of two-dimensional convolution operation circuits 230 include coefficient memories and read the coefficient data necessary for the multiplication from the coefficient memories. The plurality of two-dimensional convolution operation circuits 230 perform the two-dimensional convolution operation of the two-dimensional regions at least partially different from each other in the data held in the two-dimensional shift register. It is assumed that there are four regions (offset regions) in the example, the four regions including a coordinate position (+0, +0) as a standard, a coordinate position (+1, +0) shifted by 1 in the horizontal direction, a coordinate position (+0, +1) shifted by 1 in the vertical direction, and a coordinate position (+1, +1) shifted by 1 in each of the horizontal direction and the vertical direction. The plurality of two-dimensional convolution operation circuits 230 then calculate the two-dimensional convolution operation results in the two-dimensional regions in parallel based on the coordinate positions shifted from each other.

The plurality of adder circuits 240 are configured to add the operation results of the plurality of two-dimensional convolution operation circuits 230 in the channel direction, respectively, and output a three-dimensional convolution operation result. The operation results of the plurality of adder circuits 240 are held in the working memory 105. The plurality of adder circuits 240 then add, in the channel direction, the operation results held in the working memory 105 and the operation results of the plurality of two-dimensional convolution operation circuits 230. The plurality of adder circuits 240 repeat the operation to output the three-dimensional convolution operation result of the entire image. The plurality of adder circuits 240 are also used to add the bias $b_m$ held in the working memory 105 to the operation results of the plurality of two-dimensional convolution operation circuits 230. Note that the adder circuits 240 are an example of adder circuits described in the claims.

The pooling process circuit 250 is configured to apply a pooling process to the three-dimensional convolution operation result of the plurality of adder circuits 240. The pooling function is applied to the three-dimensional convolution operation result in the pooling process of the pooling process circuit 250. A total value, an average value, a maximum value, or the like is used for the pooling function as described above. Note that the process of the convolutional layer 40 may be continuously executed without executing the process of the pooling layer 50 of the pooling process circuit 250.

The activation process circuit 260 is configured to apply a predetermined activation process (Activation) to the three-dimensional convolution operation result output from the plurality of adder circuits 240. A ramp function (ReLU), a sigmoid function, a hyperbolic tangent function (tan h), or the like is used for the activation process of the activation process circuit 260 as described above. The output of the activation process circuit 260 is held in the working memory 105 as a feature map to be input to the next layer. Note that the feature map may be output without executing the activation process of the activation process circuit 260.

The control circuit 270 is configured to control each component of the image recognition processing circuit 200.

[Two-Dimensional Convolution Operation Circuit]

Figure 7:
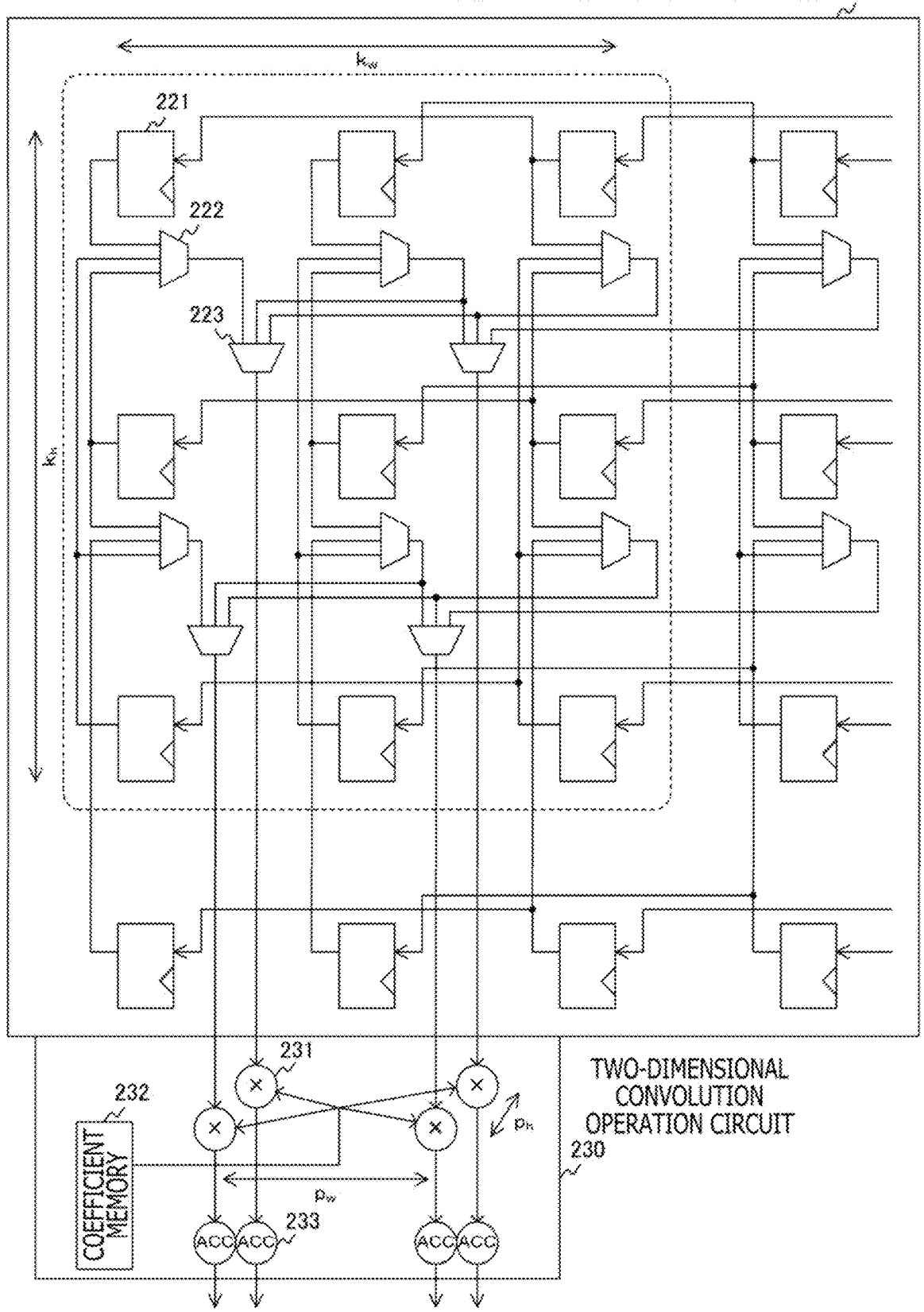
FIG. 7 is a diagram illustrating a configuration example of a two-dimensional shift register 220 and a two-dimensional convolution operation circuit 230 according to the first embodiment of the present technique.

FIG. 7 is a diagram illustrating a configuration example of the two-dimensional shift register 220 and the two-dimensional convolution operation circuit 230 according to the first embodiment of the present technique.

It is assumed here that the convolution operation of two-dimensional filters in the kernel size of $k_w \times k_h$ and with the same weight coefficient is performed at the same time. That is, the type of weight coefficient $w_m$ (i, j, k) is one (M=1). In addition, the two-dimensional convolution operation is performed at the same time for $p_w \times p_h$ regions at different pixel positions. As a result, $p_w \times p_h$ convolution operation results are obtained, and $p_w \times p_h$ convolution operation results are input to calculate pooling values. Here, $(k_w+p_w-1) \times (k_h+p_h-1)$ registers 221, $p_w \times p_h$ multipliers 231, and $p_w \times p_h$ accumulators 233 are used. In the example described below, $k_w=k_h=3$ and $p_w=p_h=2$ are set.

In the two-dimensional shift register 220, one-dimensional shift registers provided with the registers 221 in the row direction are further lined up in the column direction. The registers 221 in the one-dimensional shift registers are wired so that there are $(p_w-1)$ registers (=one register) between the registers 221 (that is, the register 221 is wired to the $(p_w)$th register 221 from the register 221), and a shift operation is performed in the row direction on the basis of $p_w$ registers (=two registers). Note that the example corresponds to the arrangement of the pixels in the image, and as a result, it is assumed that the registers are shifted from right to left in the one-dimensional shift registers. Note that the one-dimensional shift registers arranged in the row direction are an example of shift registers described in the claims. The two-dimensional shift register 220 including the shift registers lined up in the column direction is an example of a two-dimensional shift register described in the claims. In addition, the registers 221 are an example of registers described in the claims.

In the example, it is assumed that the convolution operation of two-dimensional filters with $k_w \times k_h$ pixels (3×3 pixels) is performed at the same time for $p_w \times p_h$ (=2×2) regions, that is, four regions. Here, the four regions include four regions based on the coordinate position (+0, +0), the coordinate position (+1, +0) shifted by 1 in the horizontal direction, the coordinate position (+0, +1) shifted by one pixel in the vertical direction, and the coordinate position (+1, +1) shifted by one pixel in each of the horizontal direction and the vertical direction.

Selectors 222 and 223 are provided to refer to the data necessary for the convolution operation of each of the four regions. The selector 222 is a selector that selects one piece of data from three registers arranged in the column direction. The selector 223 is a selector that selects one piece of data from three selectors 222 in the row direction. That is, three selectors 222 and one selector 223 select one piece of data from nine registers. Note that the data used in the convolution operation is, for example, 16 bits in width, and the registers 221 and the selectors 222 and 223 also need to handle the data of 16 bits in width.

Four multipliers 231 and four accumulators 233 of the two-dimensional convolution operation circuit 230 perform the convolution operation of four regions. The multiplier 231 is configured to multiply coefficient data stored in a coefficient memory 232 by the data selected by the selector 223. The coefficient memory 232 is a memory that stores coefficient data (weight coefficient) for each piece of data held in the two-dimensional shift register 220. Common coefficient data can be used for four multipliers 231, and the coefficient memory 232 is shared by the multipliers 231. The accumulators 233 are provided corresponding to the multipliers 231, respectively, and are configured to accumulate multiplication results of the multipliers 231 to output a two-dimensional convolution operation result.

[Input Buffer]

Figure 8:
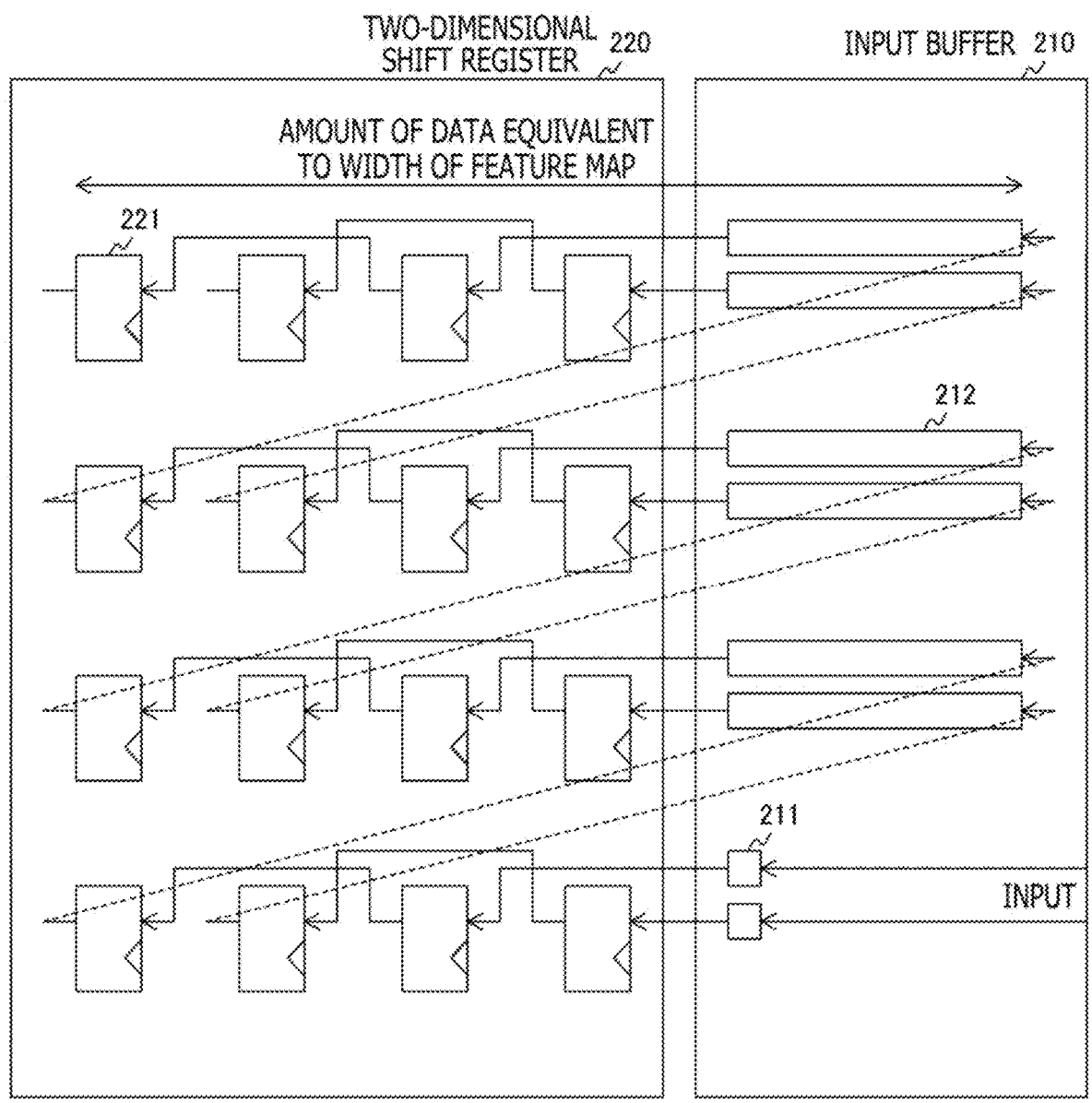
FIG. 8 is a diagram illustrating a first configuration example of an input buffer 210 according to the embodiments of the present technique.

FIG. 8 is a diagram illustrating a first configuration example of the input buffer 210 according to the embodiments of the present technique. The first configuration example of the input buffer 210 includes input FIFOs 211 and shift registers 212.

The input FIFO 211 is a memory in a FIFO (First-In First-Out) structure for holding data input to the bottom row of the two-dimensional shift register 220. The input FIFO 211 includes at least one stage of registers. The number of input FIFOs 211 is $P_w$ (=two), and the FIFOs 211 supply data to $p_w$ registers 221 at the right end of the bottom row of the two-dimensional shift register 220, respectively.

The shift register 212 is a shift register that holds the data input to each row of the two-dimensional shift register 220 except for the bottom row. The number of shift registers 212 is $p_w$ (=two) according to each row of the two-dimensional shift register 220 except for the bottom row, and the shift registers 212 supply data to $p_w$ registers 221 at the right end of each row, respectively. Note that the shift registers 212 may be realized by a FIFO structure.

In the first configuration example of the input buffer 210, $p_w$ pieces of data at the left end of each row of the two-dimensional shift register 220 are input to the corresponding shift registers 212 in the row above. The number of registers in each row of the two-dimensional shift registers 220 and the number of stages of the shift registers 212 coincide with the number of pieces of data in the width of the feature map. As a result, the input buffer 210 and the two-dimensional shift register 220 as a whole can hold all of the feature maps, and the two-dimensional convolution operation can be performed by simple control of sequential shifting. In the example, the shift-in operation to the left is performed all at once every time the two-dimensional convolution operation of $k_w \times k_h$ pixels (3×3 pixels) is performed. That is, the shift-in operation is performed once every nine cycles.

Figure 9:
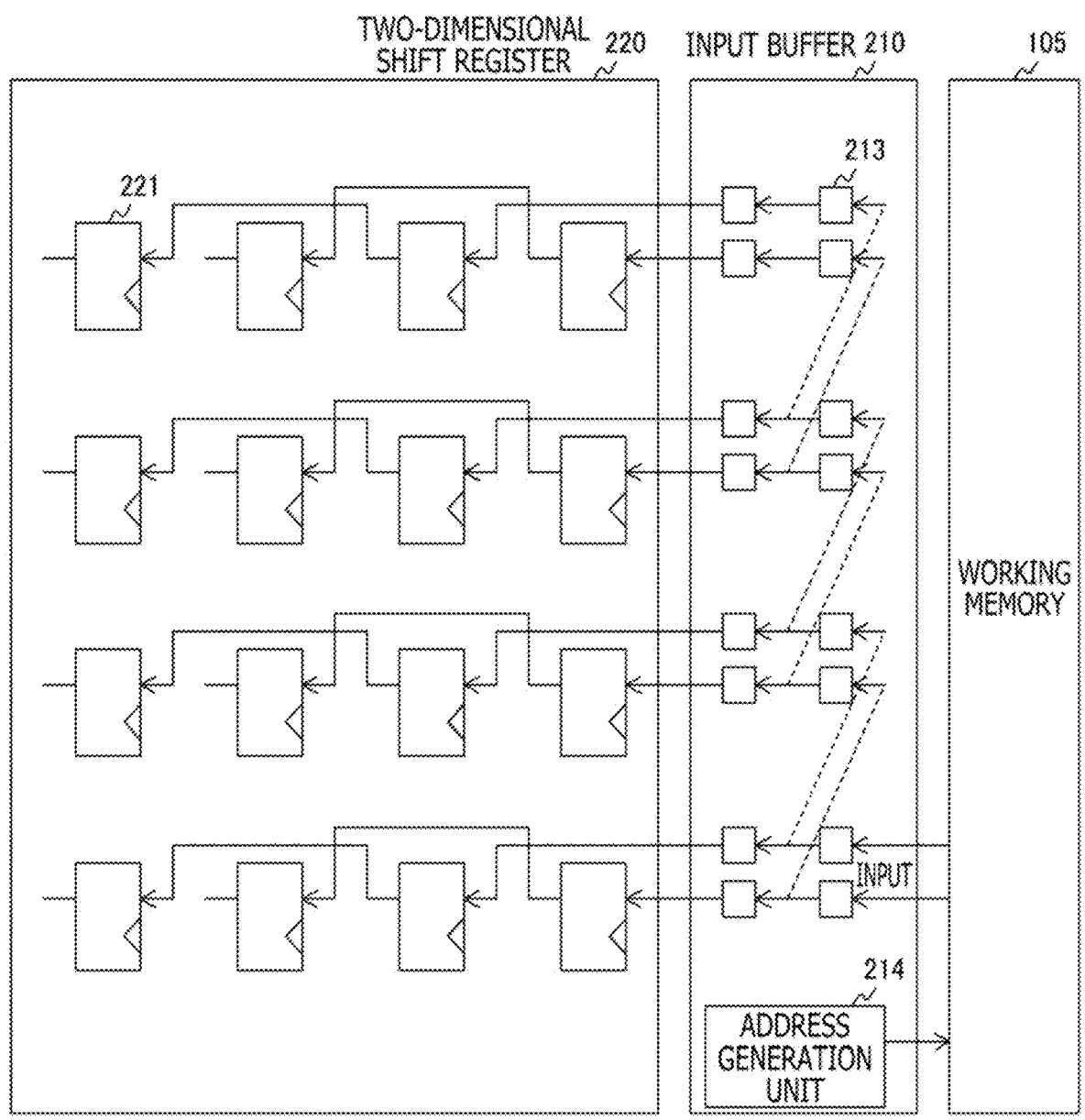
FIG. 9 is a diagram illustrating a second configuration example of the input buffer 210 according to the embodiments of the present technique.

FIG. 9 is a diagram illustrating a second configuration example of the input buffer 210 according to the embodiments of the present technique. The second configuration example of the input buffer 210 includes input buffers 213 and an address generation unit 214.

The input buffer 213 is a buffer that holds data input to each row of the two-dimensional shift register 220. The number of input buffers 213 is $P_w$ (=two) according to each row of the two-dimensional shift register 220, and the input buffers 213 supply data to $p_w$ registers 221 at the right end of each row, respectively.

In the second configuration example of the input buffer 210, the data of the input buffers 213 is transmitted from lower rows to upper rows as illustrated in FIG. 9. That is, the data of the feature map necessary for each row of the two-dimensional shift register 220 is read from the working memory 105 and supplied. Therefore, in the second configuration example of the input buffer 210, the address generation unit 214 generates a storage address of the feature map in the working memory 105.

Therefore, although the control for generating the address is necessary, not all of the data need to be sequentially shifted unlike in the first configuration example, and the data can be relatively quickly supplied to the two-dimensional shift register 220 before the start of operation. However, the frequency of the shift-in operation after the start of operation is similar to the first configuration example.

[Selector]

Figure 10:
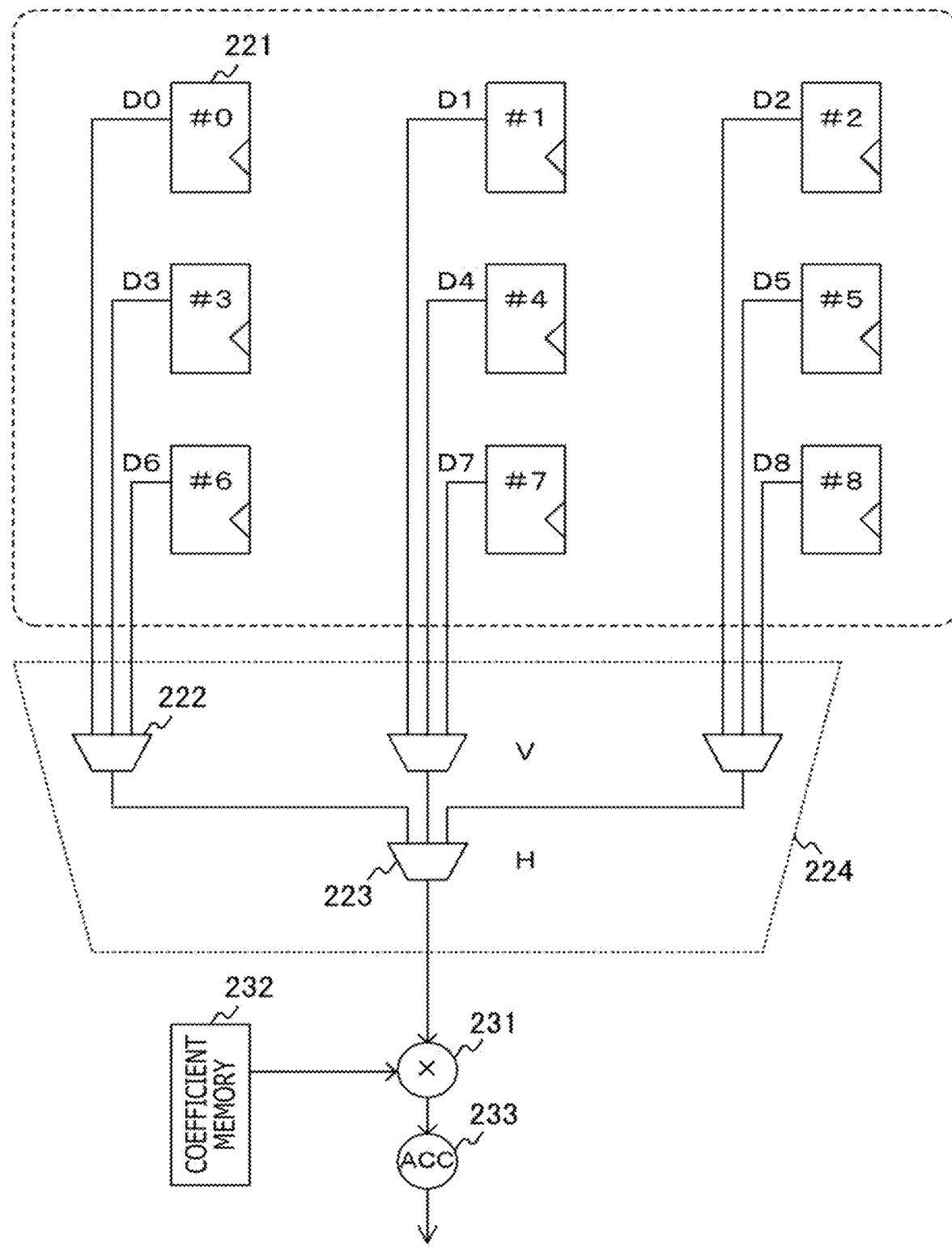
FIG. 10 is a diagram illustrating a configuration example of a selector 224 according to the embodiments of the present technique.

FIG. 10 is a diagram illustrating a configuration example of a selector 224 according to the embodiments of the present technique. As described above, three selectors 222 and one selector 223 are used to supply data from the two-dimensional shift register 220 to one multiplier 231. Here, to facilitate the understanding of the relationship between the two-dimensional shift register 220 and the multiplier 231, a selector 224 represents the three selectors 222 and the one selector 223. However, the selectors 222 are actually shared by a plurality of selectors 223. Therefore, three selectors 222 are not necessary in proportion to the number of multipliers 231, and the selector 224 is a virtual selector. Note that the selector 224 is an example of a selector described in the claims.

As described above, to illustrate the convolution operation of 3×3 pixels, numbers from #0 to #8 are provided to related registers 221 as in FIG. 10. Numbers from D0 to D8 are also provided to data output from the registers 221. The first one of the selectors 222 selects one of the data D0, the data D3, and the data D6. The second one of the selectors 222 selects one of the data D1, the data D4, and the data D7. The third one of the selectors 222 selects one of the data D2, the data D5, and the data D8. The selector 223 selects one of the outputs of the three selectors 222. That is, the selector 224 selects one of the nine pieces of data D0 to D8.

FIG. 11 is a diagram illustrating a control example of the selector 224 according to the embodiments of the present technique.

In a first cycle, a selection signal "0" is supplied to the selector 222, a selection signal "0" is supplied to the selector 223, and the data D0 is selected. In addition, an address "0" is supplied to the coefficient memory 232, and coefficient data "Coef[0]" is selected. As a result, the output of the accumulator 233 is "D0×Coef[0]." At this point, the effective bit of the output of the accumulator 233 is "L," that is, ineffective as a two-dimensional convolution operation result.

In a second cycle, a selection signal "0" is supplied to the selector 222, a selection signal "1" is supplied to the selector 223, and the data D1 is selected. In addition, an address "1" is supplied to the coefficient memory 232, and coefficient data "Coef[1]" is selected. As a result, the output of the accumulator 233 is "(D0×Coef[0])+(D1×Coef[1])." At this point, the effective bit of the output of the accumulator 233 is "L," that is, ineffective as a two-dimensional convolution operation result.

Subsequently, similar processes are repeated. In a ninth cycle, a selection signal "2" is supplied to the selector 222, a selection signal "2" is supplied to the selector 223, and the data D8 is selected. In addition, an address "8" is supplied to the coefficient memory 232, and coefficient data "Coef[8]" is selected. As a result, the output of the accumulator 233 is "(D0×Coef[0])+ . . . +(D8×Coef[8])." In this case, the effective bit of the output of the accumulator 233 is "H," that is, a value effective as a two-dimensional convolution operation result, and the effective bit is output.

[Parallel Processing Between Offset Regions]

Figure 12:
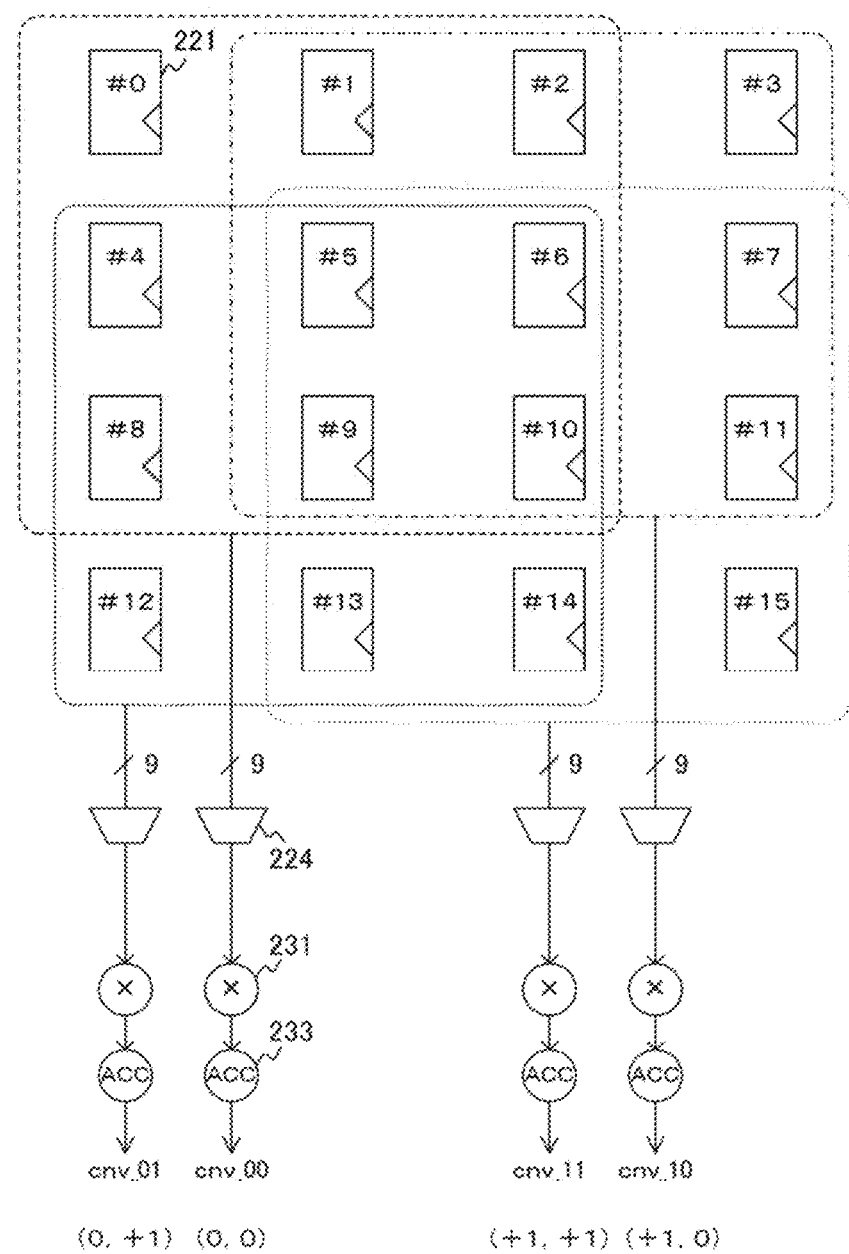
FIG. 12 is a diagram illustrating an example of parallel processing between offset regions according to the embodiments of the present technique.

FIG. 12 is a diagram illustrating an example of the parallel processing between the offset regions according to the embodiments of the present technique. Assuming that one virtual selector 224 is provided for each multiplier 231 as described above, the data of nine registers 221 are sequentially referenced. In the example illustrated here, four offset regions of 3×3 pixels shifted by one pixel in each of the horizontal direction and the vertical direction are processed in parallel. The offset regions are partially different from each other as illustrated in FIG. 12.

A two-dimensional convolution operation result cnv_00 is output in relation to the region based on the coordinate position (+0, +0). A two-dimensional convolution operation result cnv_01 is output in relation to the region based on the coordinate position (+0, +1). A two-dimensional convolution operation result cnv_10 is output in relation to the region based on the coordinate position (+1, +0). A two-dimensional convolution operation result cnv_11 is output in relation to the region based on the coordinate position (+1, +1). As described above, the selector 224 is a virtual selector, and the selectors 222 in the four selectors 224 illustrated here are shared.

Figure 13:
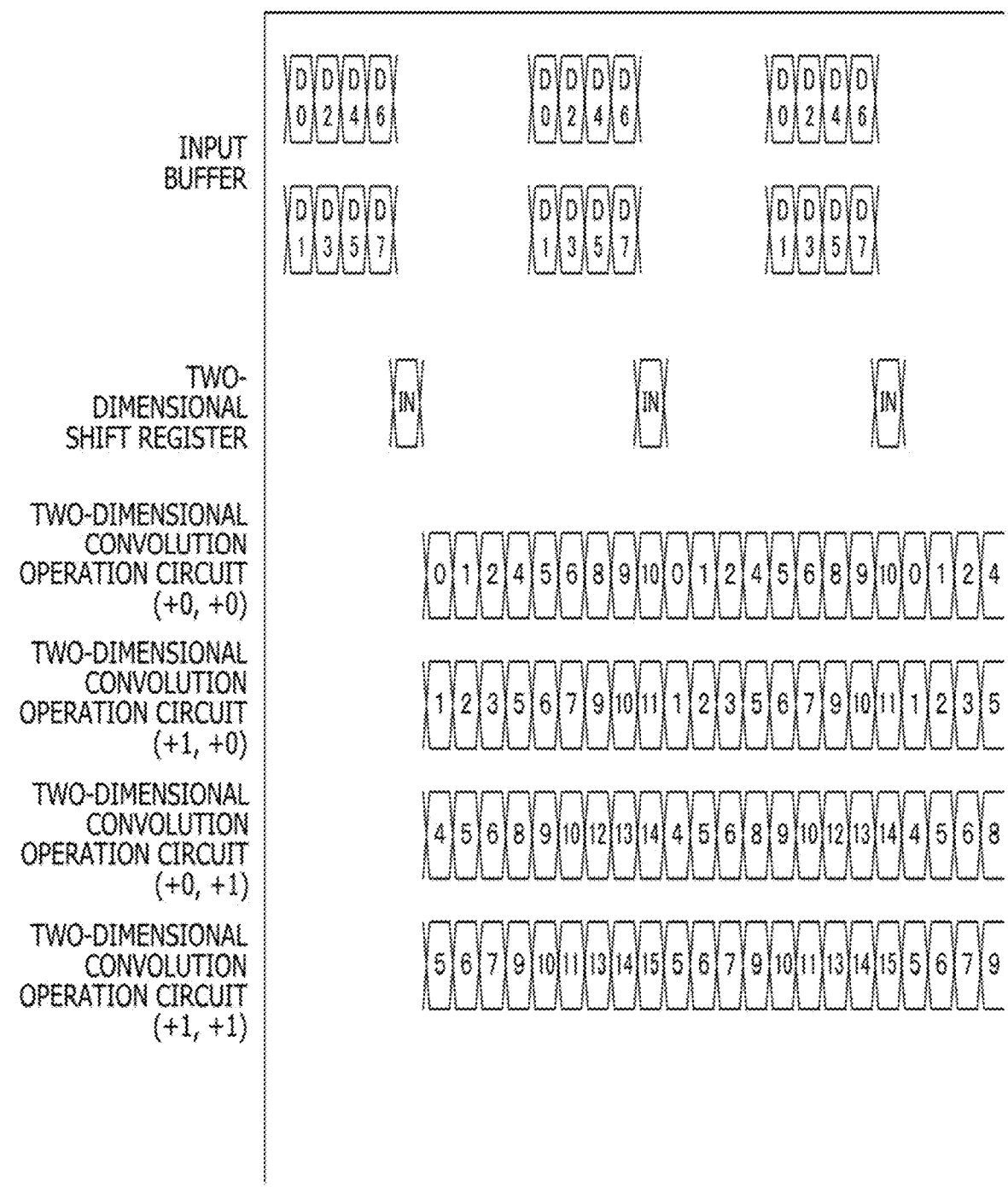
FIG. 13 is a diagram illustrating a timing example of the parallel processing between the offset regions according to the first embodiment of the present technique.

FIG. 13 is a diagram illustrating a timing example of the parallel processing between the offset regions according to the first embodiment of the present technique. In the example, the numerical values of the two-dimensional convolution operation circuits 230 represent the numbers of the registers 221 illustrated in FIG. 12.

After the shift-in operation, each of the four two-dimensional convolution operation circuits 230 sequentially selects nine pieces of data and multiplies and accumulates the data as described above. Subsequently, the shift-in operation is performed, and each of the four two-dimensional convolution operation circuits 230 sequentially selects nine pieces of data and multiplies and accumulates the data again. Subsequently, the shift-in operation is performed, and similar processes are repeated. Pipeline processing is used for the shift-in operation in the two-dimensional shift register 220 and the operation in the two-dimensional convolution operation circuit 230, and the cycle of the shift-in operation can be hidden as illustrated in FIG. 13.

In this way, in the first embodiment of the present technique, the data is supplied at the same time from the two-dimensional shift register 220 to the plurality of multipliers 231 through the selectors 224, and the plurality of two-dimensional convolution operation results for one weight coefficient are calculated in parallel. This can increase the speed of the entire process.

3. Second Embodiment

Although it is assumed that there is one type (M=1) of weight coefficient $w_m$ (i, j, k) in the first embodiment, it is assumed that there are a plurality of types of weight coefficients in a second embodiment, and convolution operation of different coefficients is continuously performed. That is, although the shift-in operation is performed every time after the convolution operation is performed in the first embodiment, new data is not shifted in after the convolution operation of a coefficient is performed in the second embodiment, and convolution operation of a new coefficient is continuously performed. This can reduce the number of shift-in operations to reduce the overall power consumption.

Note that the system configuration and the circuit configuration in the second embodiment are similar to the first embodiment, and the detailed description will not be repeated.

FIG. 14 is a diagram illustrating an example of controlling the selector 224 according to the second embodiment of the present technique. Note that it is assumed that a plurality of types of coefficient data are stored in the coefficient memory 232.

The first to ninth cycles are similar to the cycles described with reference to FIG. 11. In the following tenth cycle, a selection signal "0" is supplied to the selector 222, a selection signal "0" is supplied to the selector 223, and the data D0 is selected. In addition, an address "9" is supplied to the coefficient memory 232, and coefficient data "Coef[9]" is selected. As a result, the output of the accumulator 233 is "D0×Coef[9]." At this point, the effective bit of the output of the accumulator 233 is "L," that is, ineffective as a two-dimensional convolution operation result.

In an eleventh cycle, a selection signal "0" is supplied to the selector 222, a selection signal "1" is supplied to the selector 223, and the data D1 is selected. In addition, an address "10" is supplied to the coefficient memory 232, and coefficient data "Coef[10]" is selected. As a result, the output of the accumulator 233 is "(D0×Coef[9])+(D1×Coef[10])." At this point, the effective bit of the output of the accumulator 233 is "L," that is, ineffective as a two-dimensional convolution operation result.

Subsequently, similar processes are repeated. In an eighteenth cycle, a selection signal "3" is supplied to the selector 222, a selection signal "2" is supplied to the selector 223, and the data D8 is selected. In addition, an address "17" is supplied to the coefficient memory 232, and coefficient data "Coef[17]" is selected.

As a result, the output of the accumulator 233 is "(D0×Coef[9])+ . . . +(D8×Coef[17])." In this case, the effective bit of the output of the accumulator 233 is "H," that is, a value effective as a two-dimensional convolution operation result, and the effective bit is output.

Figure 15:
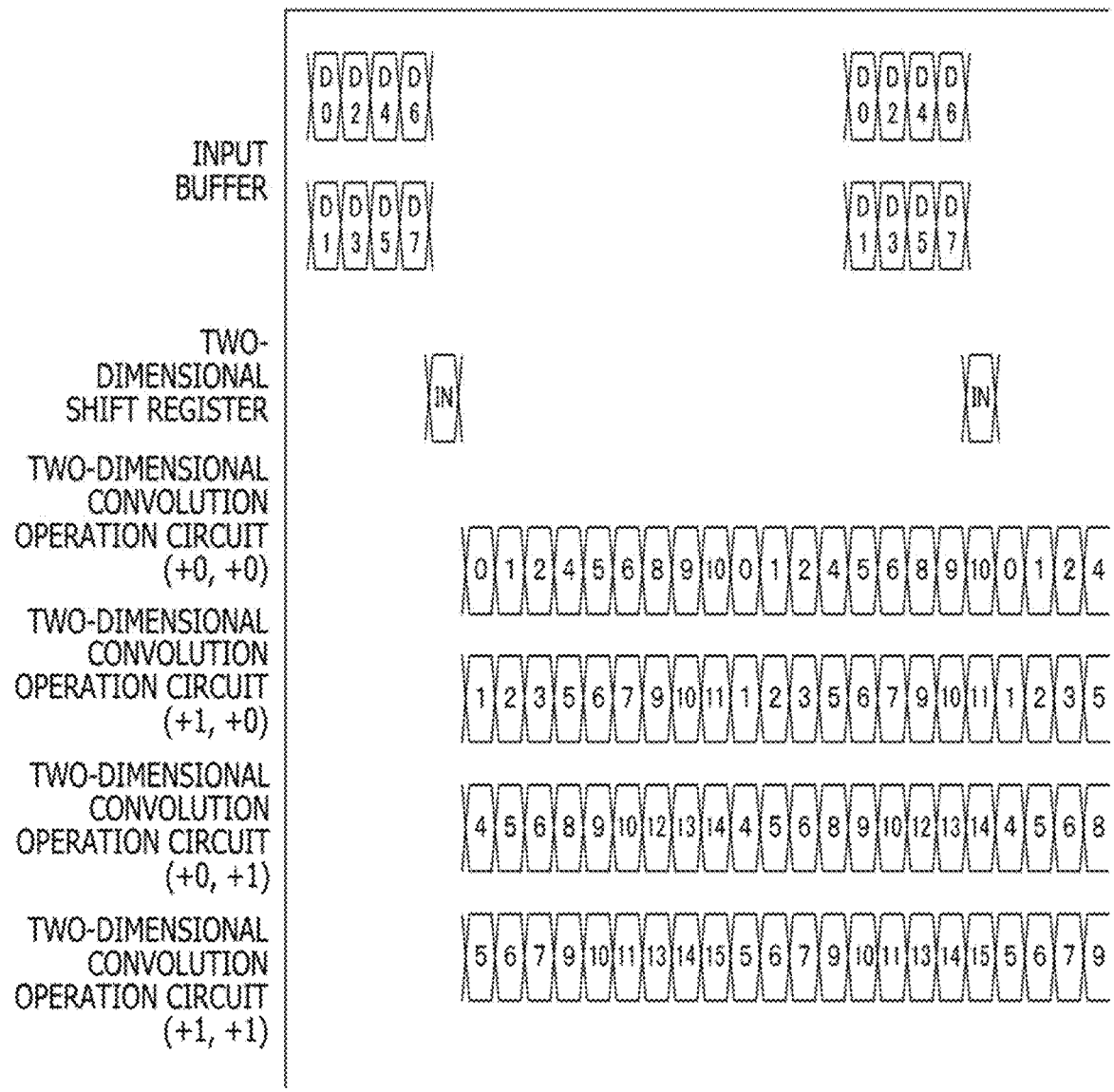
FIG. 15 is a diagram illustrating a timing example of the parallel processing between the offset regions in the control of the selector 224 according to the second embodiment of the present technique.

FIG. 15 is a diagram illustrating a timing example of the parallel processing between the offset regions in the control of the selector 224 according to the second embodiment of the present technique. In the example, the numerical values of the two-dimensional convolution operation circuits 230 represent the numbers of the registers 221 illustrated in FIG. 12.

After the shift-in operation, each of the four two-dimensional convolution operation circuits 230 sequentially selects nine pieces of data and multiplies and accumulates the data as described above. Subsequently, the shift-in operation is not performed, and the read addresses from the coefficient memory 232 are continuously changed without replacing the data held in the two-dimensional shift register 220. As a result, each of the four two-dimensional convolution operation circuits 230 sequentially selects nine pieces of data and multiplies and accumulates the data again. Subsequently, the shift-in operation is performed, and similar processes are repeated.

In this way, according to the second embodiment of the present technique, new data is not shifted in after the convolution operation of a coefficient is performed, and the convolution operation of a new coefficient is continuously performed. This can reduce the number of shift-in operations to reduce the overall power consumption.

4. Third Embodiment

Although it is assumed that there is one type (M=1) of weight coefficient $w_m$ (i, j, k) in the first embodiment, it is assumed that there are a plurality of types of weight coefficients in a third embodiment, and convolution operation of different coefficients is performed at the same time. That is, although the two-dimensional convolution operation is performed for four regions partially different from each other in the first embodiment, the two-dimensional convolution operation is also performed for four other regions not overlapping the four regions in the third embodiment.

Note that the system configuration and the circuit configuration in the third embodiment are similar to the first embodiment, and the detailed description will not be repeated. It is assumed that a plurality of types of coefficient data are stored in the coefficient memory 232.

Figure 16:
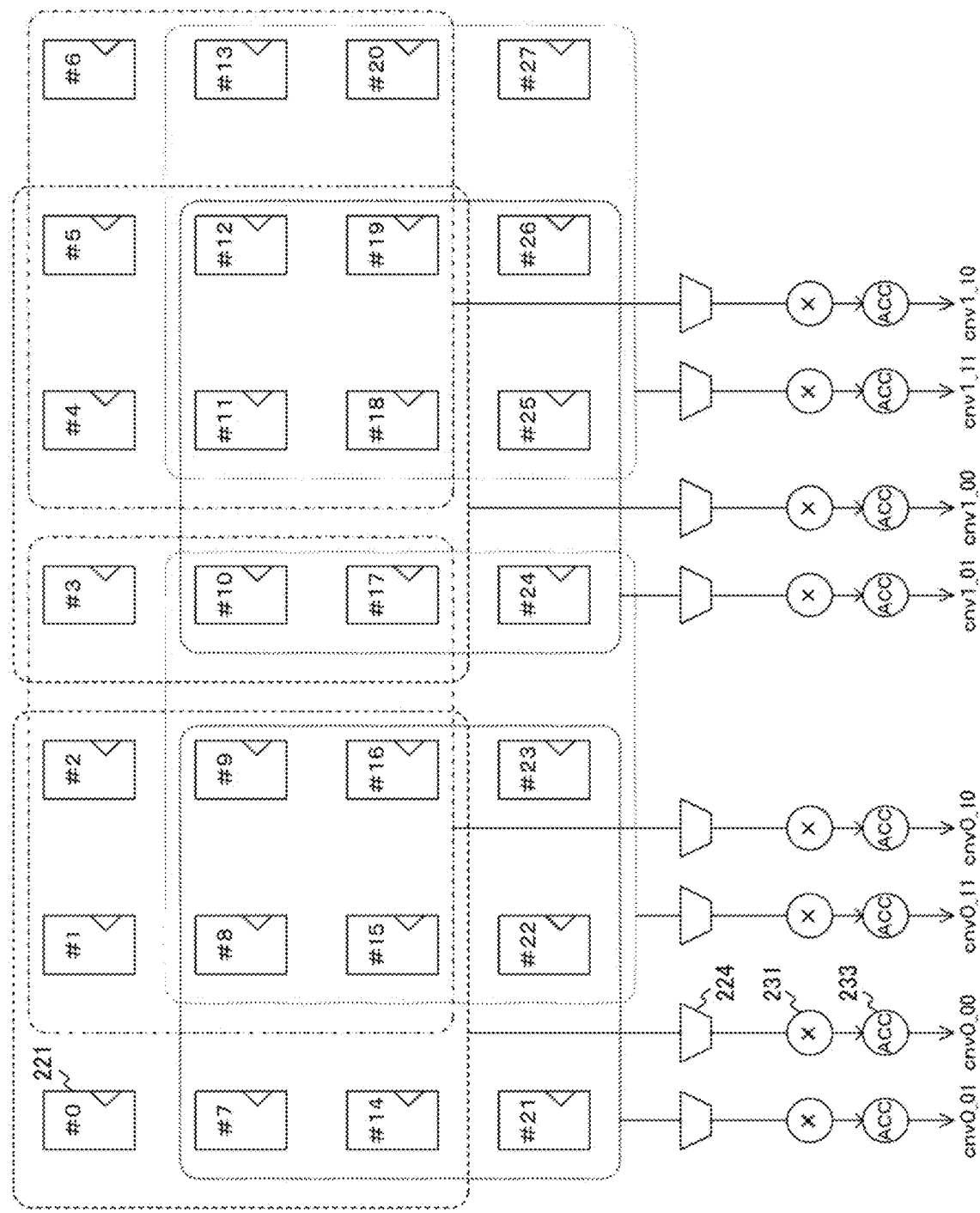
FIG. 16 is a diagram illustrating an example of two-dimensional convolution operation according to a third embodiment of the present technique.

FIG. 16 is a diagram illustrating an example of the two-dimensional convolution operation according to the third embodiment of the present technique.

As in the first embodiment, the two-dimensional convolution operation result cnv0_00 is output in relation to the region based on the coordinate position (+0, +0). The two-dimensional convolution operation result cnv0_01 is output in relation to the region based on the coordinate position (+0, +1). The two-dimensional convolution operation result cnv0_10 is output in relation to the region based on the coordinate position (+1, +0). The two-dimensional convolution operation result cnv0_11 is output in relation to the region based on the coordinate position (+1, +1).

In addition, a two-dimensional convolution operation result cnv1_00 is output in relation to a region based on a coordinate position (3, 0) in the third embodiment. A two-dimensional convolution operation result cnv1_01 is output in relation to a region based on a coordinate position (3, 1). A two-dimensional convolution operation result cnv1_10 is output in relation to a region based on a coordinate position (4, 0). A two-dimensional convolution operation result cnv1_11 is output in relation to a region based on a coordinate position (4, 1). The coefficient data used for the four regions added in the third embodiment and the coefficient data used for the four regions in the first embodiment are different. That is, the convolution operation of two-dimensional filters with two types of weight coefficients is performed at the same time (M=2).

In the third embodiment, the two-dimensional convolution operation is performed at the same time for $p_w \times p_h$ regions at different pixel positions, and $M \times p_w \times p_h$ convolution operation results are obtained. The $M \times p_w \times p_h$ convolution operation results are then input to calculate the pooling values. Here, $(M \times k_w + p_w - 1) \times (k_h \times p > -1)$ registers 221, $M \times p_w \times p_h$ multipliers 231, and $M \times p_w \times p_h$ accumulators 233 are used.

Figure 17:
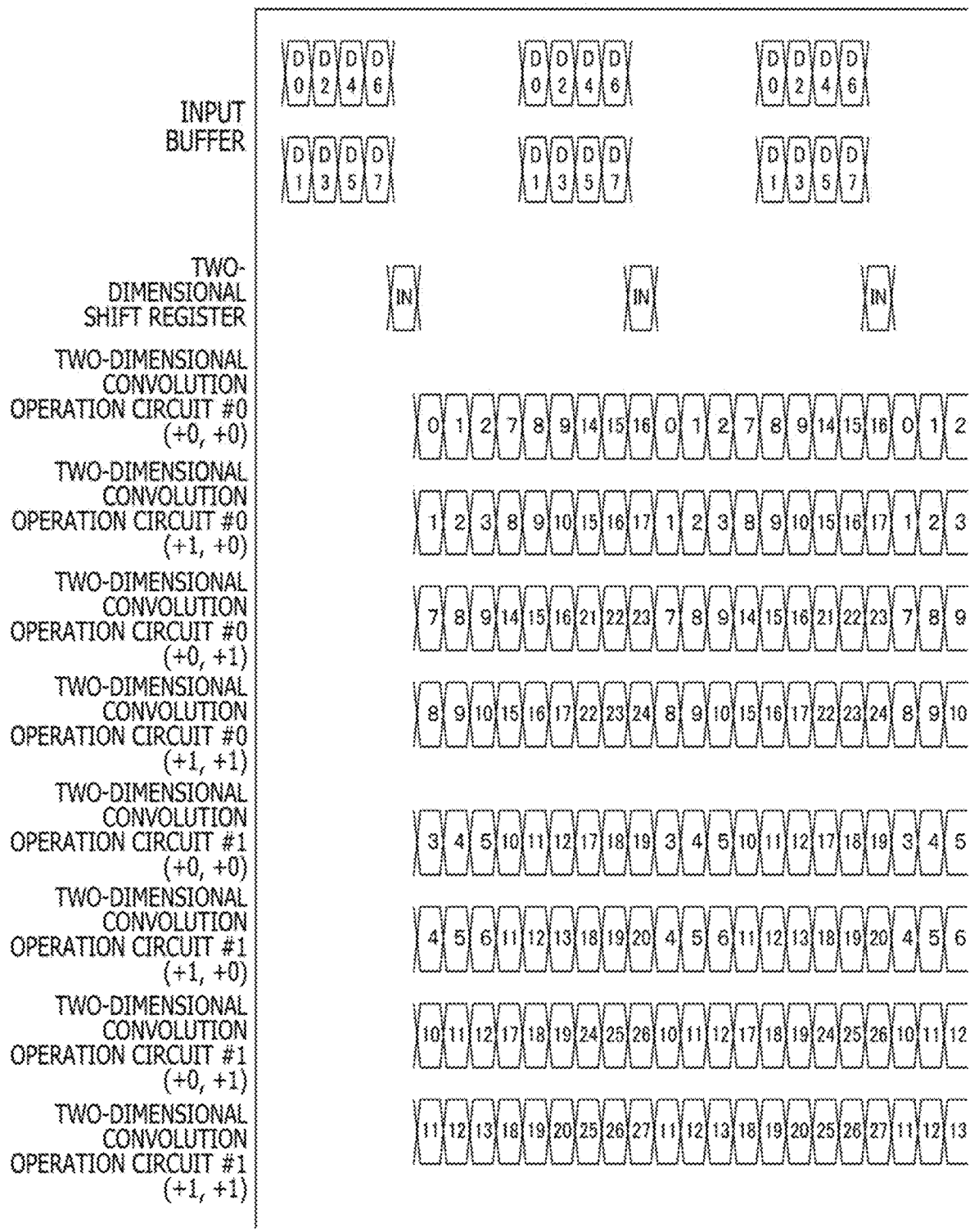
FIG. 17 is a diagram illustrating a timing example of parallel processing in the two-dimensional convolution operation according to the third embodiment of the present technique.

FIG. 17 is a diagram illustrating a timing example of the parallel processing in the two-dimensional convolution operation according to the third embodiment of the present technique. In the example, the numerical values of the two-dimensional convolution operation circuits 230 represent the numbers of the registers 221 illustrated in FIG. 16.

After the shift-in operation, each of the eight two-dimensional convolution operation circuits 230 sequentially selects nine pieces of data and multiplies and accumulates the data as described above. In this case, the coefficient data used for the four regions added in the third embodiment and the coefficient data used for the four regions of the first embodiment are different.

Subsequently, the shift-in operation is performed, and each of the eight two-dimensional convolution operation circuits 230 sequentially selects nine pieces of data and multiplies and accumulates the data again. Subsequently, the shift-in operation is performed, and similar processes are repeated.

In this way, according to the third embodiment of the present technique, the convolution operation of different types of coefficients is performed for different regions at the same time, and the degree of parallelism can be improved to increase the speed of the entire process.

5. Fourth Embodiment

Although the two-dimensional convolution operation is performed at the same time for four regions partially different from each other in relation to one weight coefficient in the first embodiment, parallel processing of a plurality of regions is further executed in a fourth embodiment. As a result, the degree of parallelism is further improved in the two-dimensional convolution operation of one weight coefficient, and the speed of the entire process is increased.

Note that the system configuration in the fourth embodiment is similar to the first embodiment, and the detailed description will not be repeated.

[Image Recognition Processing Circuit]

Figure 18:
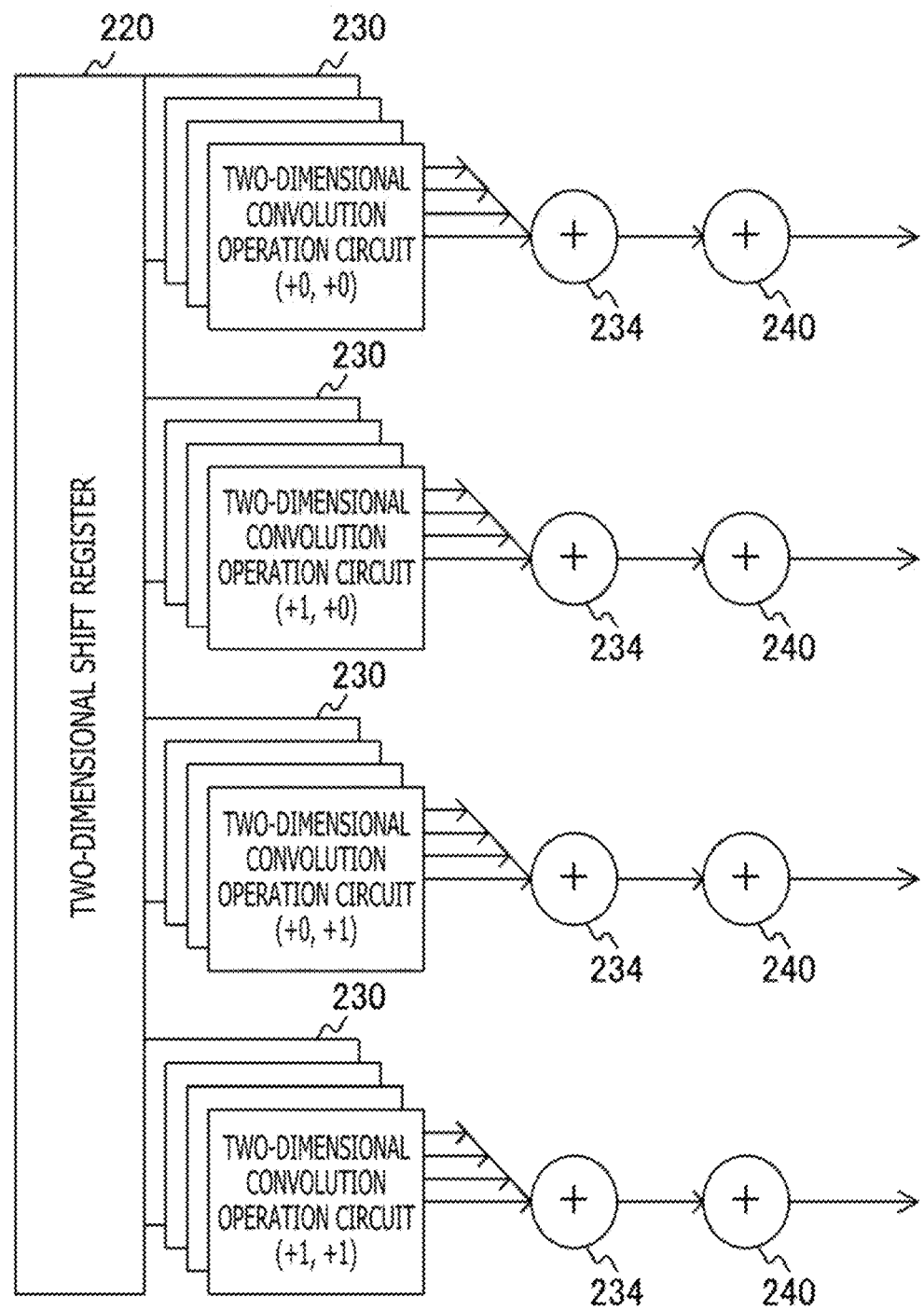
FIG. 18 is a diagram illustrating a configuration example of main parts of the image recognition processing circuit 200 according to a fourth embodiment of the present technique.

FIG. 18 is a diagram illustrating a configuration example of main parts of the image recognition processing circuit 200 according to the fourth embodiment of the present technique. Note that the input buffer 210, the pooling process circuit 250, the activation process circuit 260, and the control circuit 270 are similar to the first embodiment and are not illustrated in FIG. 18.

It is assumed that the image recognition processing circuit 200 in the fourth embodiment includes a plurality of sets (four sets in the example) of four two-dimensional convolution operation circuits 230 for four regions. The four regions in the same set are partially different and partially overlap. On the other hand, the convolution operation is independently performed for different sets, and the different sets do not have to overlap.

Four different adders 234 add the operation results of the regions based on the coordinate positions (+0,+0), (+1, +0), (+0, +1), and (+1, +1), respectively. That is, the four adders 234 are adders that add the two-dimensional convolution operations of corresponding regions in different sets.

The addition results of the four adders 234 are supplied to four adder circuits 240, respectively. The four adder circuits 240 are similar to the adder circuits 240 of the first embodiment and are adders that mainly perform the addition in the channel direction.

[Two-Dimensional Convolution Operation Circuit]

Figure 19:
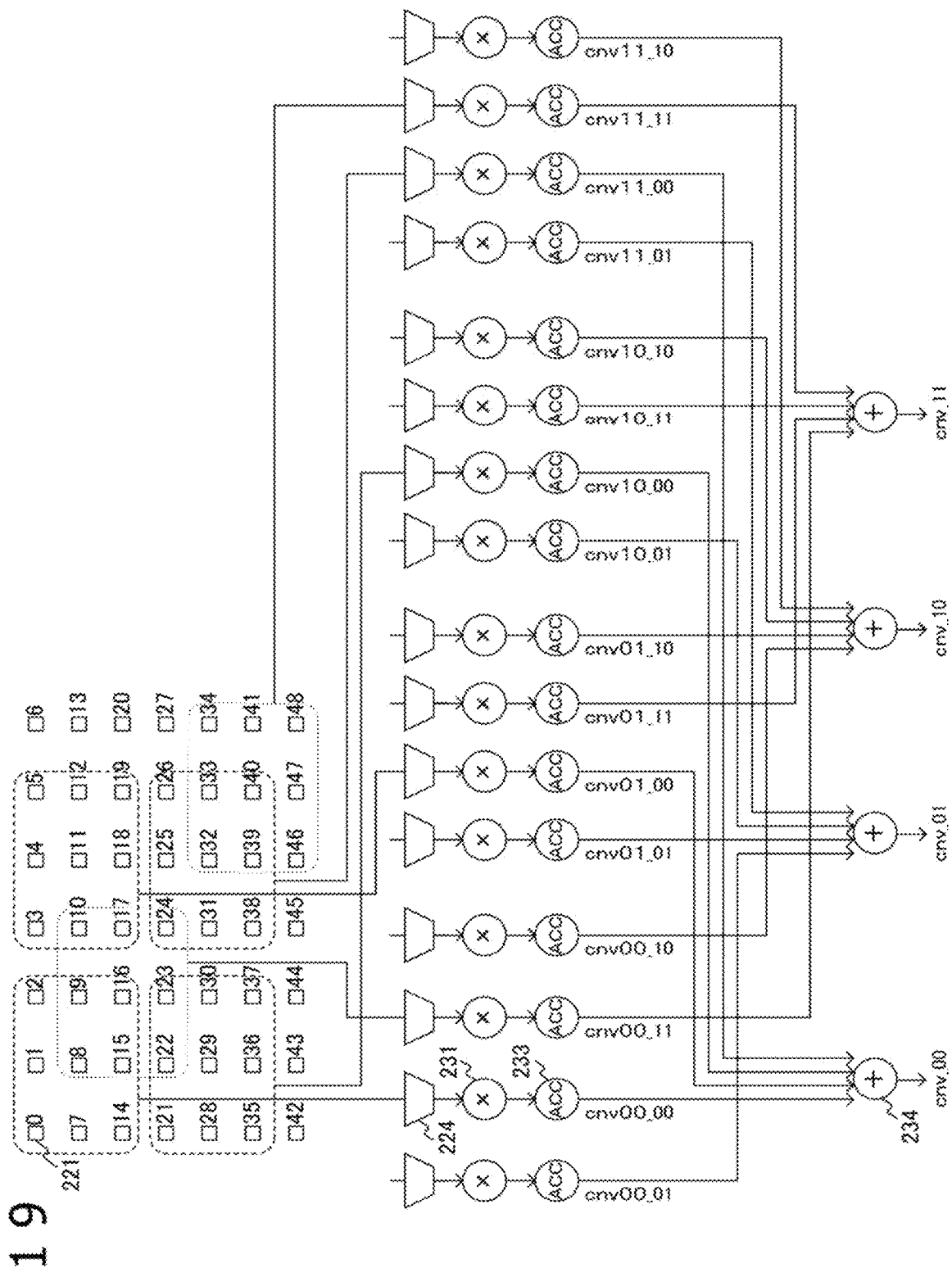
FIG. 19 is a diagram illustrating a configuration example of the two-dimensional shift register 220 and the two-dimensional convolution operation circuit 230 according to the fourth embodiment of the present technique.

FIG. 19 is a diagram illustrating a configuration example of the two-dimensional shift register 220 and the two-dimensional convolution operation circuit 230 according to the fourth embodiment of the present technique. In the example, numbers are provided to the registers 221, and the numbers will be referenced as coordinate positions.

Here, a two-dimensional convolution operation result cnv00_00 is output in relation to a region based on a coordinate position "0." A two-dimensional convolution operation result cnv00_10 is output in relation to a region based on a coordinate position "1." A two-dimensional convolution operation result cnv00_01 is output in relation to a region based on a coordinate position "7." A two-dimensional convolution operation result cnv00_11 is output in relation to a region based on a coordinate position "8." The four values form one set.

In addition, a two-dimensional convolution operation result cnv01_00 is output in relation to a region based on a coordinate position "3." A two-dimensional convolution operation result cnv01_10 is output in relation to a region based on a coordinate position "4." A two-dimensional convolution operation result cnv01_01 is output in relation to a region based on a coordinate position "10." A two-dimensional convolution operation result cnv01_11 is output in relation to a region based on a coordinate position "11." The four values form one set.

In addition, a two-dimensional convolution operation result cnv10_00 is output in relation to a region based on a coordinate position "21." A two-dimensional convolution operation result cnv10_10 is output in relation to a region based on a coordinate position "22." A two-dimensional convolution operation result cnv10_01 is output in relation to a region based on a coordinate position "28." A two-dimensional convolution operation result cnv10_11 is output in relation to a region based on a coordinate position "29." The four values form one set.

In addition, a two-dimensional convolution operation result cnv11_00 is output in relation to a region based on a coordinate position "24." A two-dimensional convolution operation result cnv11_10 is output in relation to a region based on a coordinate position "25." A two-dimensional convolution operation result cnv11_01 is output in relation to a region based on a coordinate position "31." A two-dimensional convolution operation result cnv11_11 is output in relation to a region based on a coordinate position "32." The four values form one set.

The adders 234 generate added values of the corresponding coordinate positions of the sets. That is, the added value of the two-dimensional convolution operation results cnv00_00, cnv01_00, cnv10_00, and cnv11_00 is output as a two-dimensional convolution operation result cnv_00 of the region based on the coordinate position (+0, +0). In addition, the added value of the two-dimensional convolution operation results cnv00_01, cnv01_01, cnv10_01, and cnv11_01 is output as a two-dimensional convolution operation result cnv_01 of the region based on the coordinate position (+0, +1). In addition, the added value of the two-dimensional convolution operation results cnv00_10, cnv01_10, cnv10_10, and cnv11_10 is output as a two-dimensional convolution operation result cnv_10 of the region based on the coordinate position (+1, +0). In addition, the added value of the two-dimensional convolution operation results cnv00_11, cnv01_11, cnv10_11, and cnv11_11 is output as a two-dimensional convolution operation result cnv_11 of the region based on the coordinate position (+1, +1).

In the example, 3×3 pixels is the basic unit, and the sum total of the output of a combination of four basic units is calculated for each of the coordinate positions (+0, +0), (+0, +1), (+1, +0), and (+1, +1). As a result, the convolution operation of 6×6 pixels of each coordinate position is performed. In this case, "0" can be set at an appropriate location of the coefficient stored in the coefficient memory 232, or the data selected by the selectors can be limited to perform convolution of a size smaller than the 6×6 pixels, such as 5×5 pixels and 4×4 pixels.

In addition, four sets of 6×6 pixels can also be combined to perform convolution of 12×12 pixels through a procedure similar to the procedure illustrated in the example. Furthermore, two sets of 6×6 pixels can also be combined to perform the convolution operation of 6×6 pixels with two different coefficients at the same time through a procedure similar to the procedure illustrated in the third embodiment.

In this way, according to the fourth embodiment of the present technique, the parallel processing of a plurality of two-dimensional regions different from each other can be further executed to improve the degree of parallelism and increase the speed of the entire process.

6. Fifth Embodiment

Although the adder circuits 240 sequentially repeat the addition in the channel direction in the embodiments described above, the parallel processing is further executed in the channel direction in a fifth embodiment. This further improves the degree of parallelism and increases the speed of the entire process.

Note that the system configuration in the fifth embodiment is similar to the first embodiment, and the detailed description will not be repeated.

[Image Recognition Processing Circuit]

Figure 20:
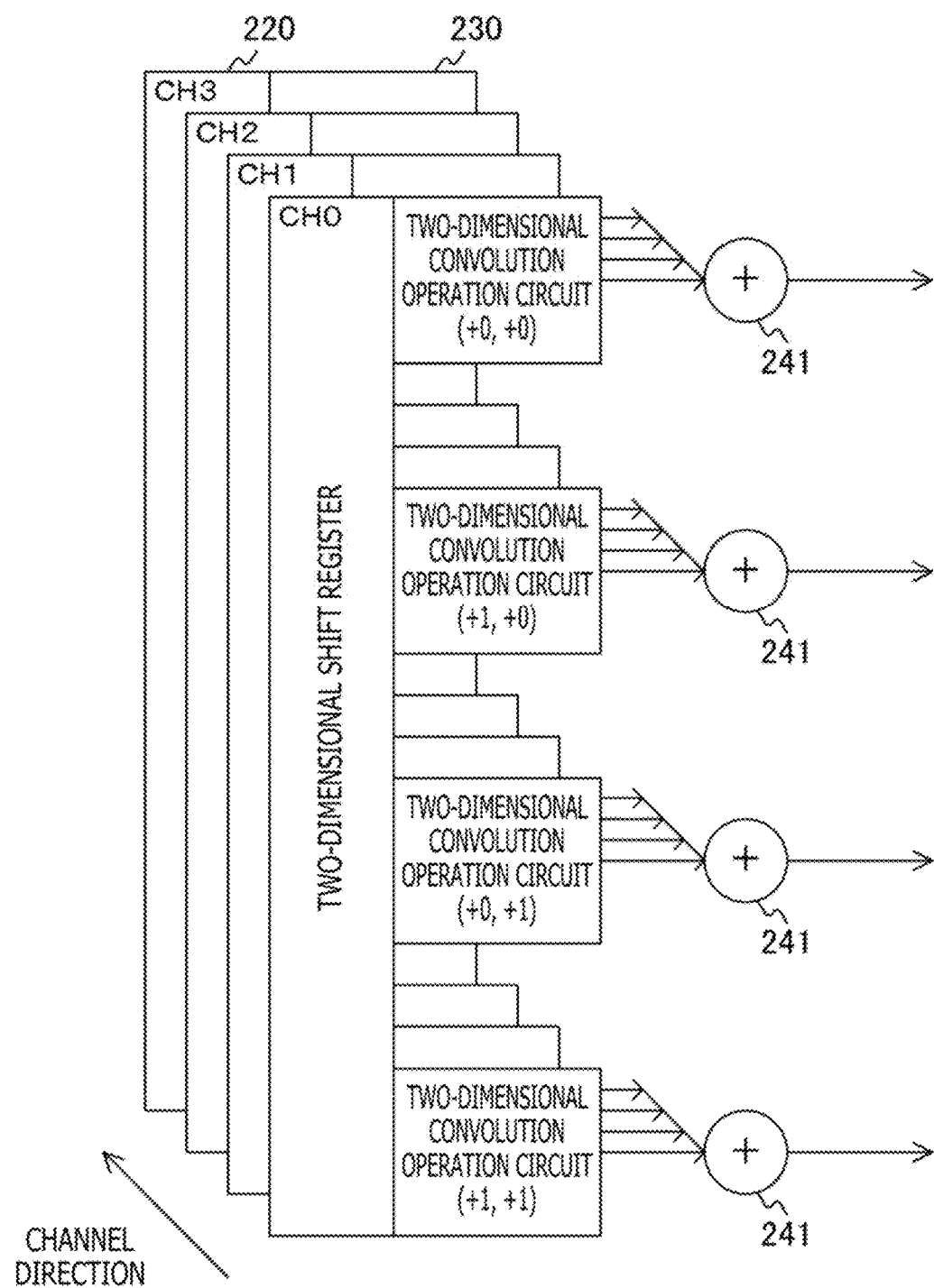
FIG. 20 is a diagram illustrating a configuration example of main parts of the image recognition processing circuit 200 according to a fifth embodiment of the present technique.

FIG. 20 is a diagram illustrating a configuration example of main parts of the image recognition processing circuit 200 according to the fifth embodiment of the present technique. Note that the pooling process circuit 250, the activation process circuit 260, and the control circuit 270 are similar to the first embodiment and are not illustrated in FIG. 20. In addition, although the input buffer 210 is not illustrated, an independent input buffer 210 is provided for each channel, and data is input to each channel. The data is supplied to independent two-dimensional shift registers 220.

It is assumed that in the image recognition processing circuit 200 of the fifth embodiment, four two-dimensional convolution operation circuits 230 for one region are provided for each of a plurality of channels (four channels in the example) in the channel direction. As a result, simultaneous operation of four channels can be performed for the standard coordinate positions (+0, +0), (+1, +0), (+0, +1), and (+1, +1).

Four different adders 241 add the operation results of the standard coordinate positions (+0, +0), (+1, +0), (+0, +1), and (+1, +1), respectively. That is, the four adders 241 are adders that add the two-dimensional convolution operations of different channels in the channel direction to generate a three-dimensional convolution operation result.

[Two-Dimensional Convolution Operation Circuit]

Figure 21:
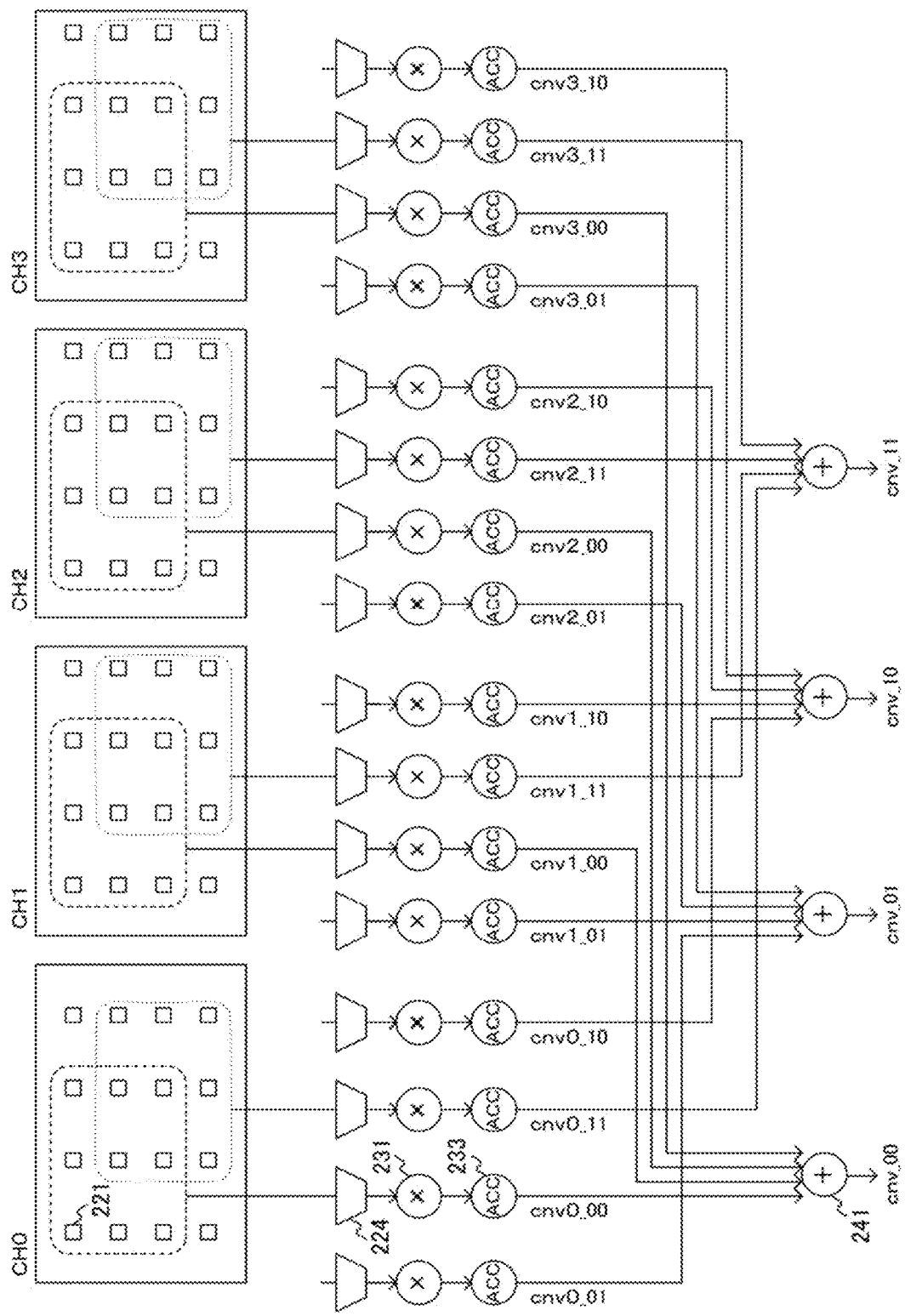
FIG. 21 is a diagram illustrating a configuration example of the two-dimensional shift register 220 and the two-dimensional convolution operation circuit 230 according to the fifth embodiment of the present technique.

FIG. 21 is a diagram illustrating a configuration example of the two-dimensional shift register 220 and the two-dimensional convolution operation circuit 230 according to the fifth embodiment of the present technique.

Here, for a channel CH0, a two-dimensional convolution operation result cnv0_00 is output in relation to the region based on the coordinate position (+0, +0). A two-dimensional convolution operation result cnv0_01 is output in relation to the region based on the coordinate position (+0, +1). A two-dimensional convolution operation result cnv0_10 is output in relation to the region based on the coordinate position (+1, +0). A two-dimensional convolution operation result cnv0_11 is output in relation to the region based on the coordinate position (+1, +1).

In addition, for a channel CH1, a two-dimensional convolution operation result cnv1_00 is output in relation to the region based on the coordinate position (+0, +0). A two-dimensional convolution operation result cnv1_01 is output in relation to the region based on the coordinate position (+0, +1). A two-dimensional convolution operation result cnv1_10 is output in relation to the region based on the coordinate position (+1, +0). A two-dimensional convolution operation result cnv1_11 is output in relation to the region based on the coordinate position (+1, +1).

In addition, for a channel CH2, a two-dimensional convolution operation result cnv2_00 is output in relation to the region based on the coordinate position (+0, +0). A two-dimensional convolution operation result cnv2_01 is output in relation to the region based on the coordinate position (+0, +1). A two-dimensional convolution operation result cnv2_10 is output in relation to the region based on the coordinate position (+1, +0). A two-dimensional convolution operation result cnv2_11 is output in relation to the region based on the coordinate position (+1, +1).

In addition, for a channel CH3, a two-dimensional convolution operation result cnv3_00 is output in relation to the region based on the coordinate position (+0, +0). A two-dimensional convolution operation result cnv3_01 is output in relation to the region based on the coordinate position (+0, +1). A two-dimensional convolution operation result cnv3_10 is output in relation the region based on the coordinate position (+1, +0). A two-dimensional convolution operation result cnv3_11 is output in relation to the region based on the coordinate position (+1, +1).

The adders 241 generate added values of the corresponding coordinate positions of the channels. That is, the added value of the two-dimensional convolution operation results cnv0_00, cnv1_00, cnv2_00, and cnv3_00 is output as a two-dimensional convolution operation result cnv_00 of the region based on the coordinate position (+0, +0). In addition, the added value of the two-dimensional convolution operation results cnv0_01, cnv1_01, cnv2_01, and cnv3_01 is output as a two-dimensional convolution operation result cnv_01 of the region based on the coordinate position (+0, +1). In addition, the added value of the two-dimensional convolution operation results cnv0_10, cnv1_10, cnv2_10, and cnv3_10 is output as a two-dimensional convolution operation result cnv_10 of the region based on the coordinate position (+1, +0). In addition, the added value of the two-dimensional convolution operation results cnv0_11, cnv1_11, cnv2_11, and cnv3_11 is output as a two-dimensional convolution operation result cnv_11 of the region based on the coordinate position (+1, +1).

The adders 241 may perform the addition for all of the channels or part of the channels. In the case where the process is executed in parallel for all of the channels, the data does not have to be saved to or read from the working memory 105. The adders 241 may perform the addition for part of the channels, and the adder circuits 240 may sequentially perform the addition in the channel direction for the rest of the channels as in the embodiments described above to generate the three-dimensional convolution operation result. Even in that case, the process can be executed for a plurality of channels at a time, and the number of accesses to the working memory 105 can be reduced compared to the case without the parallel processing. This can reduce the required memory bandwidth.

In this way, according to the fifth embodiment of the present technique, the parallel processing of the two-dimensional convolution operations regarding the plurality of channels can be further executed in the channel direction to improve the degree of parallelism and increase the speed of the entire process.

Note that the embodiments described above illustrate an example for embodying the present technique, and the matters in the embodiments and the matters used to specify the invention in the claims correspond to each other. Similarly, the matters used to specify the invention in the claims and the matters with the same names in the embodiments of the present technique correspond to each other. However, the present technique is not limited to the embodiments, and the present technique can be embodied by applying various modifications to the embodiments without departing from the scope of the present technique.

In addition, the processing procedures described in the embodiments may be regarded as a method including the series of procedures, and the processing procedures may be regarded as a program for causing a computer to execute the series of procedures or as a recording medium storing the program. Examples of the recording medium that can be used include a CD (Compact Disc), an MD (MiniDisc), a DVD (Digital Versatile Disc), a memory card, and a Blu-ray (registered trademark) Disc.

Note that the advantageous effects described in the present specification are illustrative only, and the advantageous effects are not limited. There may also be other advantageous effects.

Note that the present technique can also be configured as follows.

(1)

An operation processing circuit including:

a two-dimensional shift register including a plurality of shift registers arranged in a first direction that are lined up and sequentially connected in a second direction perpendicularly intersecting the first direction;

a plurality of selectors that sequentially select data in predetermined two-dimensional regions at least partially different from each other from data held in the two-dimensional shift register;

a coefficient memory that stores coefficient data corresponding to the data held in the two-dimensional shift register;

a plurality of two-dimensional convolution operation circuits provided corresponding to the plurality of selectors and configured to multiply the data selected by the selectors by the coefficient data stored in the coefficient memory and accumulate results of the multiplication to calculate, in parallel, two-dimensional convolution operation results in the two-dimensional regions; and a plurality of adder circuits provided corresponding to the plurality of two-dimensional convolution operation circuits and configured to add operation results of the plurality of two-dimensional convolution operation circuits in a channel direction to output a three-dimensional convolution operation result.

(2)

The operation processing circuit according to (1), in which
the coefficient memory stores a plurality of types of the coefficient data, and
each of the plurality of two-dimensional convolution operation circuits continuously performs the two-dimensional convolution operation of the data selected by the plurality of selectors and the plurality of types of the coefficient data without replacing the data held in the two-dimensional shift register.

(3)

The operation processing circuit according to (1), in which
the coefficient memory stores a plurality of types of the coefficient data, and
each of the plurality of two-dimensional convolution operation circuits performs, in parallel, the two-dimensional convolution operation for the plurality of types of the coefficient data.

(4)

The operation processing circuit according to any one of (1) to (3), in which
each of the plurality of two-dimensional convolution operation circuits further performs the two-dimensional convolution operation in parallel for the data in the two-dimensional regions different from each other of the data held in the two-dimensional shift register.

(5)

The operation processing circuit according to any one of (1) to (4), further including:
a two-dimensional convolution operation result holding unit that holds operation results of the plurality of two-dimensional convolution operation circuits, in which
the plurality of adder circuits add, in the channel direction, the operation results of the plurality of two-dimensional convolution operation circuits and the operation results held in the two-dimensional convolution operation result holding unit.

(6)

The operation processing circuit according to any one of (1) to (4), in which
the plurality of adder circuits add the operation results of the plurality of two-dimensional convolution operation circuits in parallel in the channel direction to output a three-dimensional convolution operation result.

(7)

The operation processing circuit according to any one of (1) to (6), further including:
an activation process circuit that applies a predetermined activation process to the three-dimensional convolution operation result output from the plurality of adder circuits.

(8)

The operation processing circuit according to any one of (1) to (7), further including:
a pooling process circuit that applies a pooling process to the three-dimensional convolution operation result output from the plurality of adder circuits.

(9)

The operation processing circuit according to (8), in which
the pooling process includes a process of generating a pooling value of at least one of a sum total, an average, or a maximum value of a plurality of values in the three-dimensional convolution operation result.

(10)

The operation processing circuit according to (8) or (9), in which
the two-dimensional shift register holds equal to or more than $(m \times k_w + p_w - 1) + 1) \times ((k_h + p_h - 1) + 1)$ pieces of data,
the plurality of two-dimensional convolution operation circuits include $(m \times p_w \times p_h)$ multipliers that perform the multiplication and $(m \times p_w \times p_h)$ accumulators that perform the accumulation to perform, in parallel, the two-dimensional convolution operation of a $(k_w \times k_h)$ size for $(p_w \times p_h)$ two-dimensional regions, and
the pooling process circuit uses $(m \times p_w \times p_h)$ three-dimensional convolution operation results as input data to generate m pooling values, m being an integer equal to or greater than 1, and $k_w$, $k_h$, $p_w$, and $p_h$ are integers equal to or greater than 2.

(11)

The operation processing circuit according to (10), in which
the plurality of shift registers of the two-dimensional shift register include registers wired in the first direction so that there are $(p_w - 1)$ registers between the registers, and the plurality of shift registers perform shift operation in the first direction on a basis of $p_w$ registers.

(12)

The operation processing circuit according to any one of (8) to (11), in which
the data held in the two-dimensional shift register is used as an input to execute a feature amount extraction process of a convolutional layer and a pooling layer in a convolutional neural network.

(13)

A recognition system including:
a data acquisition unit that acquires data to be processed; and
an operation processing circuit that uses the data as an input to execute a feature amount extraction process of a convolutional layer and a pooling layer in a convolutional neural network,
the operation processing circuit including:
a two-dimensional shift register including a plurality of shift registers arranged in a first direction that are lined up and sequentially connected in a second direction perpendicularly intersecting the first direction;
a plurality of selectors that sequentially select data in predetermined two-dimensional regions at least partially different from each other from data held in the two-dimensional shift register;
a coefficient memory that stores coefficient data corresponding to the data held in the two-dimensional shift register;
a plurality of two-dimensional convolution operation circuits provided corresponding to the plurality of selectors and configured to multiply the data selected by the selectors by the coefficient data stored in the coefficient memory and accumulate results of the multiplication to calculate, in parallel, two-dimensional convolution operation results in the two-dimensional regions;
a plurality of adder circuits provided corresponding to the plurality of two-dimensional convolution operation circuits and configured to add operation results of the plurality of two-dimensional convolution operation circuits in a channel direction to output a three-dimensional convolution operation result; and a pooling process circuit that applies a pooling process to the three-dimensional convolution operation result output from the plurality of adder circuits, in which the recognition system repeats operation of causing the two-dimensional shift register to hold the data to execute the process in the operation processing circuit to output the three-dimensional convolution operation result as a feature amount of the data and then causing the two-dimensional shift register to hold the output feature amount again to execute the process in the operation processing circuit to output the three-dimensional convolution operation result as a new feature amount.

REFERENCE SIGNS LIST

10 Input image
20 Feature amount extractor
30 Discriminator
40 Convolutional layer
50 Pooling layer
60 Fully connected layer
90 Output
101 Image acquisition unit
102 External memory
103 Memory controller
104 DMA controller
105 Working memory
106 Control computer
107 Bus
200 Image recognition processing circuit
210 Input buffer
212 Shift register
213 Input buffer
214 Address generation unit
220 Two-dimensional shift register
221 Register
222 to 224 Selectors
230 Two-dimensional convolution operation circuit
231 Multiplier
232 Coefficient memory
233 Accumulator
234, 240, 241 Adders
250 Pooling process circuit
260 Activation process circuit
270 Control circuit

The invention claimed is:
1. An operation processing circuit comprising:
a two-dimensional shift register including a plurality of shift registers arranged in a first direction that are lined up and sequentially connected in a second direction perpendicularly intersecting the first direction;
a plurality of selectors that sequentially select data in predetermined two-dimensional regions at least partially different from each other from data held in the two-dimensional shift register;
a coefficient memory that stores coefficient data corresponding to the data held in the two-dimensional shift register;
a plurality of two-dimensional convolution operation circuits provided corresponding to the plurality of selectors and configured to multiply the data selected by the selectors by the coefficient data stored in the coefficient memory and accumulate results of the multiplication to calculate, in parallel, two-dimensional convolution operation results in the two-dimensional regions; and a plurality of adder circuits provided corresponding to the plurality of two-dimensional convolution operation circuits and configured to add operation results of the plurality of two-dimensional convolution operation circuits in a channel direction to output a three-dimensional convolution operation result.

2. The operation processing circuit according to claim 1, wherein
the coefficient memory stores a plurality of types of the coefficient data, and
each of the plurality of two-dimensional convolution operation circuits continuously performs the two-dimensional convolution operation of the data selected by the plurality of selectors and the plurality of types of the coefficient data without replacing the data held in the two-dimensional shift register.

3. The operation processing circuit according to claim 1, wherein
the coefficient memory stores a plurality of types of the coefficient data, and
each of the plurality of two-dimensional convolution operation circuits performs, in parallel, the two-dimensional convolution operation for the plurality of types of the coefficient data.

4. The operation processing circuit according to claim 1, wherein
each of the plurality of two-dimensional convolution operation circuits further performs the two-dimensional convolution operation in parallel for the data in the two-dimensional regions different from each other of the data held in the two-dimensional shift register.

5. The operation processing circuit according to claim 1, further comprising:
a two-dimensional convolution operation result holding unit that holds operation results of the plurality of two-dimensional convolution operation circuits, wherein
the plurality of adder circuits add, in the channel direction, the operation results of the plurality of two-dimensional convolution operation circuits and the operation results held in the two-dimensional convolution operation result holding unit.

6. The operation processing circuit according to claim 1, wherein
the plurality of adder circuits add the operation results of the plurality of two-dimensional convolution operation circuits in parallel in the channel direction to output a three-dimensional convolution operation result.

7. The operation processing circuit according to claim 1, further comprising:
an activation process circuit that applies a predetermined activation process to the three-dimensional convolution operation result output from the plurality of adder circuits.

8. The operation processing circuit according to claim 1, further comprising:
a pooling process circuit that applies a pooling process to the three-dimensional convolution operation result output from the plurality of adder circuits.

9. The operation processing circuit according to claim 8, wherein
the pooling process includes a process of generating a pooling value of at least one of a sum total, an average, or a maximum value of a plurality of values in the three-dimensional convolution operation result.

10. The operation processing circuit according to claim 8, wherein
the two-dimensional shift register holds equal to or more than $(m \times k_w+p_w-1)+1) \times ((k_h+p_h-1)+1)$ pieces of data,
the plurality of two-dimensional convolution operation circuits include $(m \times p_w \times p_h)$ multipliers that perform the multiplication and $(m \times p_w \times p_h)$ accumulators that perform the accumulation to perform, in parallel, the two-dimensional convolution operation of a $(k_w \times k_h)$ size for $(p_w \times p_h)$ two-dimensional regions, and
the pooling process circuit uses $(m \times p_w \times p_h)$ three-dimensional convolution operation results as input data to generate m pooling values, m being an integer equal to or greater than 1, and $k_w$, $k_h$, $p_w$, and $p_h$ are integers equal to or greater than 2.

11. The operation processing circuit according to claim 10, wherein
the plurality of shift registers of the two-dimensional shift register include registers wired in the first direction so that there are $(p_w-1)$ registers between the registers, and the plurality of shift registers perform shift operation in the first direction on a basis of $P_w$ registers.

12. The operation processing circuit according to claim 8, wherein
the data held in the two-dimensional shift register is used as an input to execute a feature amount extraction process of a convolutional layer and a pooling layer in a convolutional neural network.

13. A recognition system comprising:
a data acquisition unit that acquires data to be processed; and
an operation processing circuit that uses the data as an input to execute a feature amount extraction process of a convolutional layer and a pooling layer in a convolutional neural network,
the operation processing circuit including:
a two-dimensional shift register including a plurality of shift registers arranged in a first direction that are lined up and sequentially connected in a second direction perpendicularly intersecting the first direction;
a plurality of selectors that sequentially select data in predetermined two-dimensional regions at least partially different from each other from data held in the two-dimensional shift register;
a coefficient memory that stores coefficient data corresponding to the data held in the two-dimensional shift register;
a plurality of two-dimensional convolution operation circuits provided corresponding to the plurality of selectors and configured to multiply the data selected by the selectors by the coefficient data stored in the coefficient memory and accumulate results of the multiplication to calculate, in parallel, two-dimensional convolution operation results in the two-dimensional regions;
a plurality of adder circuits provided corresponding to the plurality of two-dimensional convolution operation circuits and configured to add operation results of the plurality of two-dimensional convolution operation circuits in a channel direction to output a three-dimensional convolution operation result; and
a pooling process circuit that applies a pooling process to the three-dimensional convolution operation result output from the plurality of adder circuits, wherein
the recognition system repeats operation of causing the two-dimensional shift register to hold the data to execute the process in the operation processing circuit to output the three-dimensional convolution operation result as a feature amount of the data and then causing the two-dimensional shift register to hold the output feature amount again to execute the process in the operation processing circuit to output the three-dimensional convolution operation result as a new feature amount.

* * * * *